US010325409B2

(12) United States Patent
Costa

(10) Patent No.: US 10,325,409 B2
(45) Date of Patent: Jun. 18, 2019

(54) OBJECT HOLOGRAPHIC AUGMENTATION

(71) Applicant: MICROSOFT TECHNOLOGY LICENSING, LLC, Redmond, WA (US)

(72) Inventor: Carlos Fernando Faria Costa, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 25 days.

(21) Appl. No.: 15/625,422

(22) Filed: Jun. 16, 2017

(65) Prior Publication Data

US 2018/0365898 A1    Dec. 20, 2018

(51) Int. Cl.
*G06T 19/00* (2011.01)
*G02B 27/01* (2006.01)
*G06K 9/62* (2006.01)
*G06F 1/16* (2006.01)
*G06F 3/01* (2006.01)
*G06F 3/03* (2006.01)
(Continued)

(52) U.S. Cl.
CPC ........ *G06T 19/006* (2013.01); *G02B 27/0172* (2013.01); *G06F 1/163* (2013.01); *G06F 3/011* (2013.01); *G06F 3/012* (2013.01); *G06F 3/0304* (2013.01); *G06F 3/038* (2013.01); *G06K 9/6267* (2013.01); *G02B 2027/0138* (2013.01); *G02B 2027/0178* (2013.01); *G06F 3/04815* (2013.01); *G06F 3/04842* (2013.01)

(58) Field of Classification Search
CPC .................................................. G06T 19/006
See application file for complete search history.

(56) References Cited

U.S. PATENT DOCUMENTS 8,711,206 B2    4/2014   Newcombe et al.
8,922,590 B1 *  12/2014  Luckett, Jr. ............ G09G 5/377
                                                    345/633
(Continued)

FOREIGN PATENT DOCUMENTS

WO    2012107517 A1    8/2012
WO    2016014873       1/2016
WO    2017044398 A1    3/2017

OTHER PUBLICATIONS

Corrales, et al., "Tracking based on Hue-Saturation Features with a Miniaturized Active Vision System", In Proceedings of 40th International Symposium on Robotics, Mar. 10, 2009, pp. 107-112.
(Continued)

*Primary Examiner* — Ryan R Yang
(74) *Attorney, Agent, or Firm* — NovoTechIP International PLLC

(57) ABSTRACT

Devices, systems, and methods for augmenting a real-world object using a mixed reality device, involving capturing image data for a real-world object included in a physical space observed by the mixed reality device; automatically classifying the real-world object as being associated with an object classification based on the image data; automatically identifying a software application based on the real-world object being associated with the object classification; associating the software application with the real-world object; and executing the software application on the mixed reality device in association with the real-world object.

18 Claims, 15 Drawing Sheets

(51) Int. Cl.
*G06F 3/038* (2013.01)
*G06F 3/0481* (2013.01)
*G06F 3/0484* (2013.01)

(56) References Cited

U.S. PATENT DOCUMENTS

| | | |
|---|---|---|
| 8,963,805 B2 | 2/2015 | Sugden et al. |
| 9,210,413 B2 | 12/2015 | Grinberg et al. |
| 9,245,387 B2 | 1/2016 | Poulos et al. |
| 9,324,229 B2 * | 4/2016 | Baillot ............. G08B 13/19621 |
| 9,367,136 B2 | 6/2016 | Latta et al. |
| 2009/0167787 A1 | 7/2009 | Bathiche et al. |
| 2012/0306850 A1 | 12/2012 | Balan et al. |
| 2014/0152558 A1 | 6/2014 | Salter et al. |
| 2015/0235432 A1 | 8/2015 | Bronder et al. |
| 2015/0254793 A1 | 9/2015 | Hastings et al. |
| 2016/0077785 A1 | 3/2016 | Sugden et al. |
| 2016/0162020 A1 | 6/2016 | Lehman et al. |
| 2016/0173293 A1 | 6/2016 | Kennedy |
| 2016/0292850 A1 | 10/2016 | Perez et al. |
| 2016/0371884 A1 | 12/2016 | Benko et al. |
| 2017/0004655 A1 | 1/2017 | Scavezze et al. |
| 2017/0103583 A1 | 4/2017 | Poulos et al. |
| 2017/0337742 A1 * | 11/2017 | Powderly ................ G06F 3/012 |

OTHER PUBLICATIONS

Gellersen, et al., "Supporting Device Discovery and Spontaneous Interaction with Spatial References", In Journal of Personal and Ubiquitous Computing, vol. 13, Issue 4, May, 2009, pp. 255-264.
"International Search Report and Written Opinion Issued in PCT Application No. PCT/US2018/034261", dated Aug. 9, 2018, 15 Pages.

* cited by examiner

OBJECT HOLOGRAPHIC AUGMENTATION

BACKGROUND

Many consumer electronic devices, such as "Internet of Things" types of devices, include limited or no display and/or user input hardware. Instead, such devices rely on the use of other systems to fully control or otherwise realize their capabilities. For example, many IoT types of devices rely on use of a smartphone and a custom smartphone app for interacting with and controlling them. Correctly identifying, and then successfully installing and configuring such apps is often an uncertain and/or tedious process. Even after a device has been successfully paired with a smartphone app, experiences such as having to install separate apps for a significant number devices, accessing the appropriate app for a particular device, and limitations in smartphone form factors and interfaces is tedious and complicated. Such factors pose significant barriers to widespread adoption of such devices.

SUMMARY

Systems for a mixed reality device are disclosed. The system can include one or more outward facing image sensors included in the mixed reality device and configured to capture first image data for a first real-world object included in a physical space observed by the mixed reality device. The system may also include an object classifier configured to automatically classify the first real-world object as being associated with a first object classification based on the captured first image data, and an application identifier configured to automatically identify a first software application based on the first real-world object being associated with the first object classification. In addition, the system can include a controller configured to store data associating the first software application with the first real-world object, and execute the first software application on the mixed reality device in association with the first real-world object.

In another aspect, methods for augmenting a real-world object using a mixed reality device are disclosed. The method may include capturing first image data for a first real-world object included in a physical space observed by the mixed reality device, and automatically classifying the first real-world object as being associated with a first object classification based on the first image data. The method can also include automatically identifying a first software application based on the first real-world object being associated with the first object classification, associating the first software application with the first real-world object, and executing the first software application on the mixed reality device in association with the first real-world objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1A:
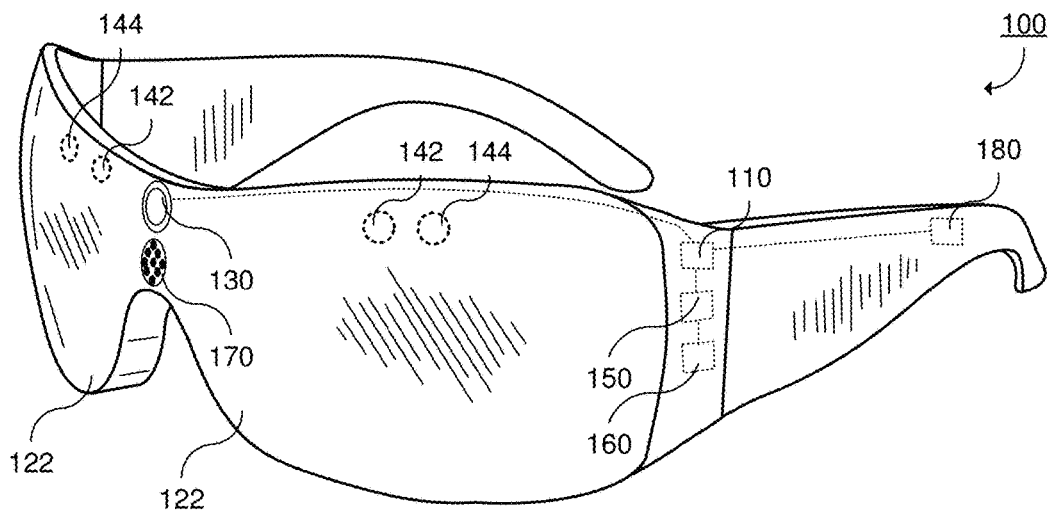
FIG. 1A illustrates an example of a mixed reality (MR) device.
Figure 1B:
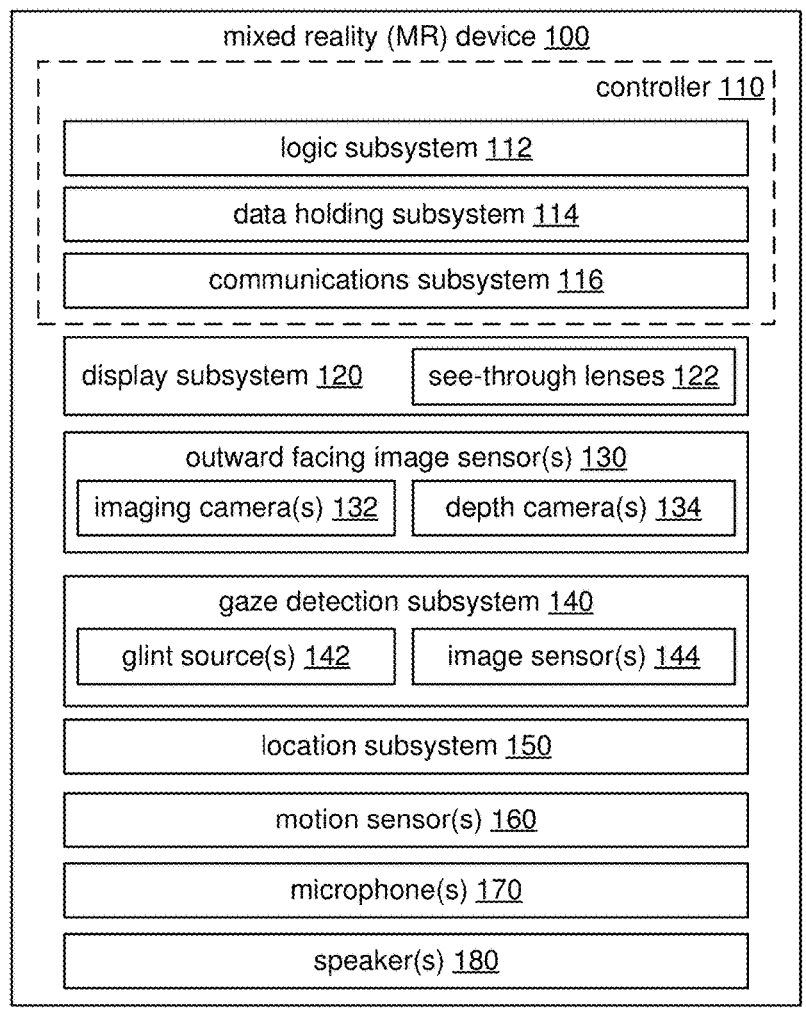
FIG. 1B illustrates a block diagram of the MR device illustrated in FIG. 1A.

FIG. 1A illustrates an example of a mixed reality (MR) device 100, and FIG. 1B illustrates a block diagram of the MR device 100 illustrated in FIG. 1A. In the example illustrated in FIGS. 1A and 1B, the MR device 100 is a head mounted MR device, intended to be worn on a user's head during ordinary use, including a head mounted display (HMD) device. However, it is noted that this disclosure is expressly not limited head mounted MR devices, and techniques described herein may be used with other types of MR devices, including, but not limited to, smartphone devices, tablet computers, notebook computers, and devices or systems including heads up displays that are configured to provide mixed reality capabilities. Mixed reality refers to an experience allowing virtual imagery to be mixed with a real-world physical environment in a display. For example, real-world objects and/or real-world spaces may be identified and augmented with corresponding virtual objects. Mixed reality may be implemented with, for example, virtual reality or augmented reality technologies.

The MR device 100 includes a display subsystem 120 for displaying images to a user of the MR device 100. In the example illustrated in FIG. 1A, the display subsystem 120 is intended to be close to a user's eyes and includes a see-through HMD device including one or more transparent or semi-transparent see-through lenses 122 arranged such that images may be projected onto the see-through lenses 122, or produced by image-producing elements (for example, see-through OLED displays) located within the see-through lenses 122. A user wearing the MR device 100 has an actual direct view of a real-world space (instead of image representations of the real-world space) through the see-through lenses 122, and at the same time view virtual objects (which may be referred to as virtual images or holograms) that augment the user's direct view of the real-world space. It is noted that this disclosure is expressly not limited to MR devices using see-through display devices. In some implementations, the display subsystem 120 may be non-transparent and not allow, in all or part of a user's field of view, the user to directly view a scene through the display subsystem 120. Such implementations include, but are not limited to, augmented reality devices arranged to display visual images of a physical space in front of the MR device 100 with virtual objects added to augment the display of the physical space, and virtual reality devices arranged to display virtual objects at positions corresponding to those of real-world objects in a physical space in front of the MR device 100. In some implementations, the MR device 100 may be embodied in a handheld mobile device arranged to display augmentations on a display device such as an LCD panel. In such implementations, the handheld mobile device may be arranged to provide a "window" in with virtual augmentations may be displayed for a scene around the MR device 100.

The MR device 100 further includes one or more outward facing image sensors 130 configured to acquire image data for a real-world scene around and/or in front of the MR device 100. The outward facing image sensors 130 may include one or more digital imaging camera(s) 132 arranged to capture two-dimensional visual images. In some implementations, two imaging camera(s) 132 may be used to capture stereoscopic images. The outward facing imaging sensors 130 may also include one or more depth camera(s) 134, such as, but not limited to, time of flight depth cameras, arranged to capture a depth image data, such as a depth map providing estimated and/or measured distances from the MR device 100 to various portions of a field of view (FOV) of the depth camera(s) 134. Depth image data obtained via the depth camera(s) 134 may be registered to other image data, such as images concurrently captured via imaging camera(s) 132. The outward facing image sensors 130 may be configured to capture individual images and/or sequences of images (for example, at a configurable frame rate or frames rates). In some implementations, the outward facing image sensors 130 or other sensors associated with the MR device 100 can be configured to assess and/or identify external conditions, including but not limited to time of day, direction of lighting, ambiance, temperature, and other conditions. The external conditions can provide the MR device 100 with additional factor(s) to determine types of virtual graphical elements to display to a user.

The MR device 100 may further include a gaze detection subsystem 130 configured to detect, or provide sensor data for detecting, a direction of gaze of each eye of a user, as illustrated in FIGS. 1A and 1B. The gaze detection subsystem 130 may be arranged to determine gaze directions of each of a user's eyes in any suitable manner. For example, in the example illustrated in FIGS. 1A and 1B, the gaze detection subsystem 130 includes one or more glint sources 132, such as infrared light sources, arranged to cause a glint of light to reflect from each eyeball of a user, and one or more image sensor(s) 134 arranged to capture an image of each eyeball of the user. Changes in the glints from the user's eyeballs as determined from image data gathered via image sensor(s) 134 may be used to determine a direction of gaze. Further, a location at which gaze lines projected from the user's eyes intersect the external display may be used to determine an object or position at which the user is gazing (for example, a virtual object displayed by the display subsystem 120). The gaze detection subsystem 130 may have any suitable number and arrangement of glint sources and image sensors. In one non-limiting example embodiment, four glint sources and one image sensor are used for each eye. Furthermore, in some implementations, the gaze detection subsystem 130 can be configured to assist the MR device 100 in more accurately identifying real-world objects of interest and associating such objects with virtual applications.

The MR device 100 may include a location subsystem 150 arranged to provide a location of the MR device 100. Location subsystem 150 may be arranged to determine a current location based on signals received from a navigation satellite system, such as, but not limited to, GPS (United States), GLONASS (Russia), Galileo (Europe), and CNSS (China), and technologies augmenting such signals, such as, but not limited to, augmented GPS (A-GPS). The location subsystem 150 may be arranged to determine a location based on radio frequency (RF) signals identifying transmitting devices and locations determined for such devices. By way of example, Wi-Fi, Bluetooth, Zigbee, RFID, NFC, and cellular communications include device identifiers that may be used for location determination. MR device 100 may be arranged to use a location provided by the location subsystem 150 as an approximate location, which is refined based on data collected by other sensors. The MR device 100 may include audio hardware, including one or more microphones 170 arranged to detect sounds, such as verbal commands from a user of the MR device 100, and/or one or more speaker(s) 180 arranged to output sounds to the user, such as verbal queries, responses, instructions, and/or information.

The MR device 100 may include one or more motion sensor(s) 160 arranged to measure and report motion of the MR device 100 as motion data. In some implementations, the motion sensor(s) 160 may include an inertial measurement unit (IMU) including accelerometers (such as a 3-axis accelerometer), gyroscopes (such as a 3-axis gyroscope), and/or magnetometers (such as a 3-axis magnetometer). The MR device 100 may be arranged to use this motion data to determine changes in position and/or orientation of MR device 100, and/or respective changes in position and/or orientation of objects in a scene relative to MR device 100. The outward facing image sensor(s) 130, image sensor(s) 144, sensors included in the location subsystem 150, motion sensor(s) 160, and microphone(s) 170, which are included in or are coupled to the head mounted MR device 100, may be, individually or collectively, as head mounted sensors. Data collected via such head mounted sensors reflect the position and orientations of a user's head.

The MR device 100 further includes a controller 110 including a logic subsystem 112, a data holding subsystem 114, and a communications subsystem 116. The logic subsystem 112 may include, for example, one or more processors configured to execute instructions and communicate with the other elements of the MR device 100 illustrated in FIGS. 1A and 1B according to such instructions to realize various aspects of this disclosure involving the MR device 100. Such aspects include, but are not limited to, configuring and controlling devices, processing sensor input, communicating with other computer systems, and/or displaying virtual objects via display subsystem 120. The data holding subsystem 114 includes one or more memory devices (such as, but not limited to, DRAM devices) and/or one or more storage devices (such as, but not limited to, flash memory devices). The data holding subsystem 114 includes one or more media having instructions stored thereon which are executable by the logic subsystem 112, which cause the logic subsystem 112 to realize various aspects of this disclosure involving the MR device 100. Such instructions may be included as part of an operating system, application programs, or other executable programs. The communications subsystem 116 is arranged to allow the MR device 100 to communicate with other computer systems. Such communication may be performed via, for example, Wi-Fi, cellular data communications, and/or Bluetooth.

It will be appreciated that the MR device 100 is provided by way of example, and thus is not meant to be limiting. Therefore, it is to be understood that the MR device 100 may include additional and/or alternative sensors, cameras, microphones, input devices, output devices, etc. than those shown without departing from the scope of this disclosure. Further, the physical configuration of an MR device and its various sensors and subcomponents may take a variety of different forms without departing from the scope of this disclosure.

Figure 2:
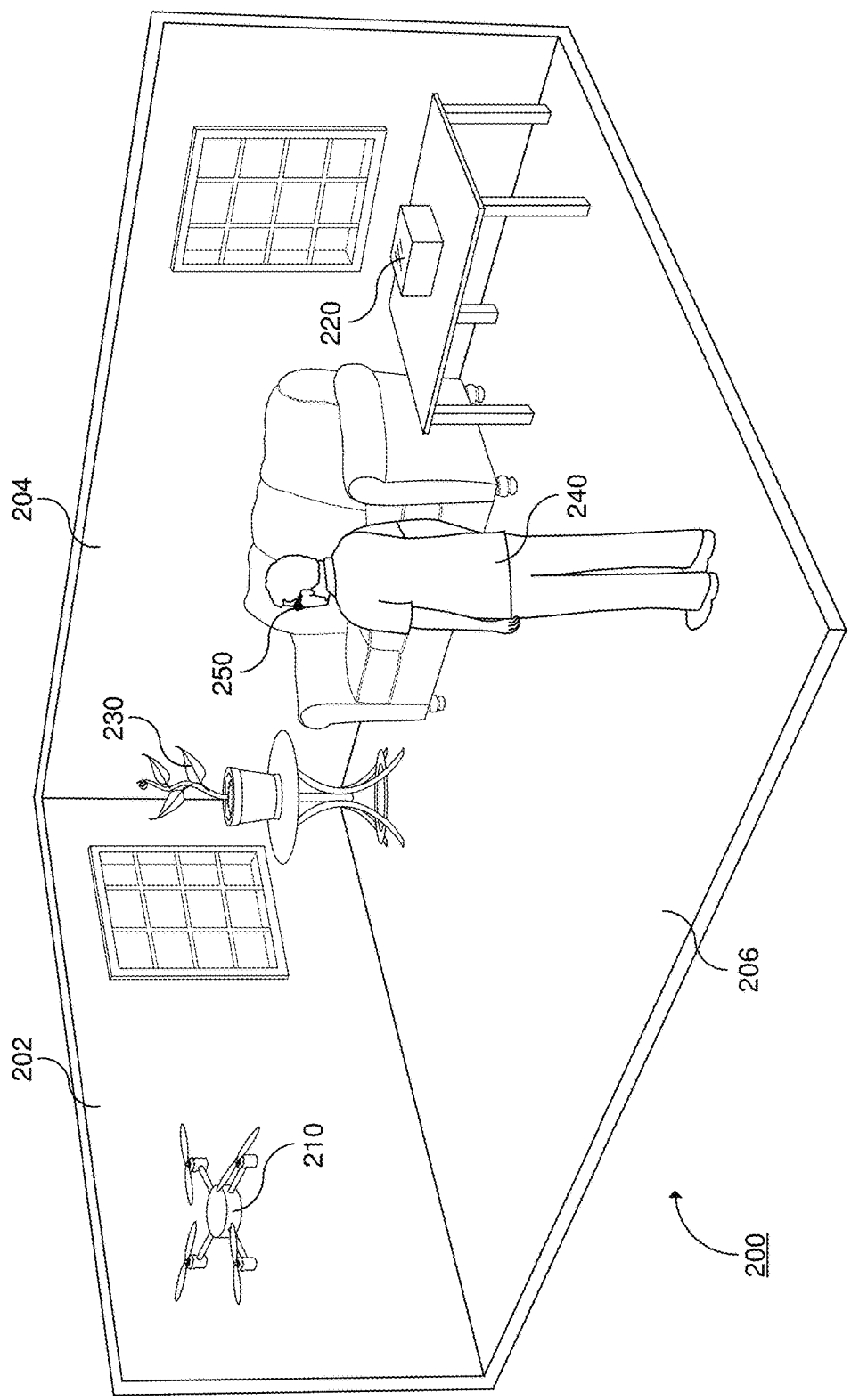
FIG. 2 illustrates an example of a user wearing an MR device while in a physical space with a plurality of real objects.

FIG. 2 illustrates an example of a user 240 making use of an MR device 250 in a physical space 200. As shown in FIG. 2, the user 240 is located within the physical space 200 and is viewing the physical space 200 through an MR device 250. In the example illustrated in FIG. 2, the MR device 250 is a head mounted see-through MR device allowing the user 240 to directly view the physical space 200, and includes the elements of the MR device 100 illustrated in FIGS. 1A and 1B. However, it is understood that is merely an example implementations, and that any of the various other examples of MR devices described in connection with FIGS. 1A and 1B may also be used to implement the disclosed techniques.

For purposes of this application, the term "physical space" refers to an area or volume of the real world. A location of, boundary for, and/or other attributes of a physical space may be described in part by one or more coordinates, including, but not limited to, two-dimensional (2D) coordinates and three-dimensional (3D) coordinates. For example, the physical space 200 might be described in part using a plurality of coordinates identifying corners of a polygon (such as four corners of a rectangle) and/or defining a volume. In some examples, a physical space might be described in part using a coordinate (for example, for a corner of a room) and a length, width, and orientation describing a rectangular space relative to the coordinate. In some examples, such coordinates may include absolute coordinates relative to the Earth (for example, latitude, longitude, and height or altitude, or three-dimensional Cartesian coordinates with an origin at the Earth's center) or another astronomical body or object, whether artificial or naturally occurring. In some examples, such coordinates may include relative coordinates defined relative to, for example, a selected absolute coordinate (for example, a fixed location on Earth), a structure (including, but not limited to, fixed, mobile, and temporary structures), or object. A relative coordinate may be defined relative to a movable object, such as, but not limited to, a container, a shipping container, or a vehicle (for example, a three-dimensional Cartesian coordinate system might be defined for a cruise ship with an axis parallel to a centerline of the ship and with an origin at a defined position on, in, or near the ship). Attributes of a physical space may also be described in part by one or more directions (absolute or relative), orientations (absolute or relative), and/or distances (for example, a distance from a coordinate in a given direction). In some implementations, a coordinate, direction, orientation, and/or distance used to describe a physical space may itself be described in terms of an amount of precision and/or accuracy (for example, a scanner may be less precise or accurate at a greater distance), whether it is estimated (for example, an initial guess or estimate may be made for an attribute before the attribute is observed), a method of measurement (for example, whether measured using GPS or an optical scanner), an estimated error, and/or a time at which it was determined. A boundary for a physical space may be described in part by an object and/or surface. For example, the MR device 250 may identify and classify walls 202 and 204 and floor 206, assign respective identifiers to walls 202 and 204 and floor 206, and describe physical space 200 as being bounded in part by the walls 202 and 204 and floor 206.

A physical space may include, be included in, and/or overlap other physical spaces. For example, the physical space 200 illustrated in FIG. 2 may be included within a larger physical space that encompasses a house. Although the physical space 200 illustrated in FIG. 2 is a room bounded by walls, such as the walls 202 and 204, physical spaces are not limited to rooms or necessarily enclosed areas bounded by walls, ceilings, or other structures. For example, a plurality of physical spaces, reflecting areas in which different activities are performed, may be defined within a large warehouse or factory without internal walls. In another example, the physical space 200 can include spaces associated with vehicles or any type of moving vessel, such as, but not limited to, cars, trucks, boats, ships, airplanes, spacecraft, shuttles, and stations. Thus, in some implementations, the physical space 200 may be described in part by coordinates that are not Earth-bound, and can include areas where a standard longitude and latitude based coordinate system does not apply, such as physical spaces included in vessels designed for space exploration or other journeys outside of Earth.

A physical space may be associated with one or more classifications (which may also be referred to as types, tags, or labels). For example, the physical space 200 might be associated with classifications such as "enclosed space," "room," "living room," and "interior space." A classification for physical spaces may be associated with one or more activities and/or types of activities that typically occur or are performed within a physical space. A classification for physical spaces may be associated with one or more objects and/or types of objects that are typically used or included with a physical space. The MR device 250 may be configured to automatically determine locations of and/or boundaries for physical spaces, and may be configured to automatically classify physical spaces, as is discussed in more detail below. Automatic classifications for a physical space may begin with general classifications, and over time more specific classifications may replace or be added to the more general classifications. For example, initially the MR device 250 might generally classify physical space 200 as an "enclosed room" and later have collected enough information about the physical space 200 to classify it as a "living room." Locations, boundaries, and/or classifications of physical spaces may be manually specified and/or modified, including by using MR device 250.

Physical spaces such as the room illustrated in FIG. 2 can include or contain various real-world (i.e., tangible) objects. In the example of FIG. 2, the physical space 200 includes, among other things, a first real-world object 210, a second real-world object 220, and a third real-world object 230. A real-world object may also be referred to as a "physical object" or, in some contexts, simply an "object." For purposes of reference, real-world objects can be considered and/or designated to be "static" or "dynamic" in different implementations. For example, in one implementation, the first real-world object 210 may be designated a dynamic object, while second real-world object 220 and third real-world object 230 may both be designated static objects. For purposes of this application, a static object refers to an object that is generally intended to remain stationary or in the substantially same position or location during use or interaction with the object. The use of the term static should not be understood to mean the object is unable to move or be moved, or must remain in the same position, but rather that in typical use or observation of the object, the object is stationary. For example, the user 240 might pick up the third real-world object 230 and move it to a new location. In contrast, a dynamic object is one that is determined to be capable of movement or locomotion and can be expected to regularly change position and/or orientation throughout its use or during its observation. However, a dynamic object need not always be in motion and can be at rest for significant periods of time. In addition, dynamic objects can include mechanical devices configured to move, such as various robotics or vehicles, as well as objects that are attached to a moving object, such as a portable device or accessory worn by or carried on a person.

FIG. 2 illustrates a time when the user 240 is utilizing the MR device 250 in the physical space 200 for a first time. At that time, data structures describing the physical space 200 and/or real-world objects located therein may be in an initial configuration or state. For example, boundaries for physical space 200 may not yet be determined, and/or locations and identities for the real-world objects 210, 220, and 230 may not yet be determined. However, while the user 240 is present in the physical space 200, the MR device 250 can initiate and continue a process of capturing image data (including, for example, visual images and depth image data) and use of the captured image data to recognize, identify, register, classify, or otherwise analyze physical space 200 and objects located therein.

Figure 3:
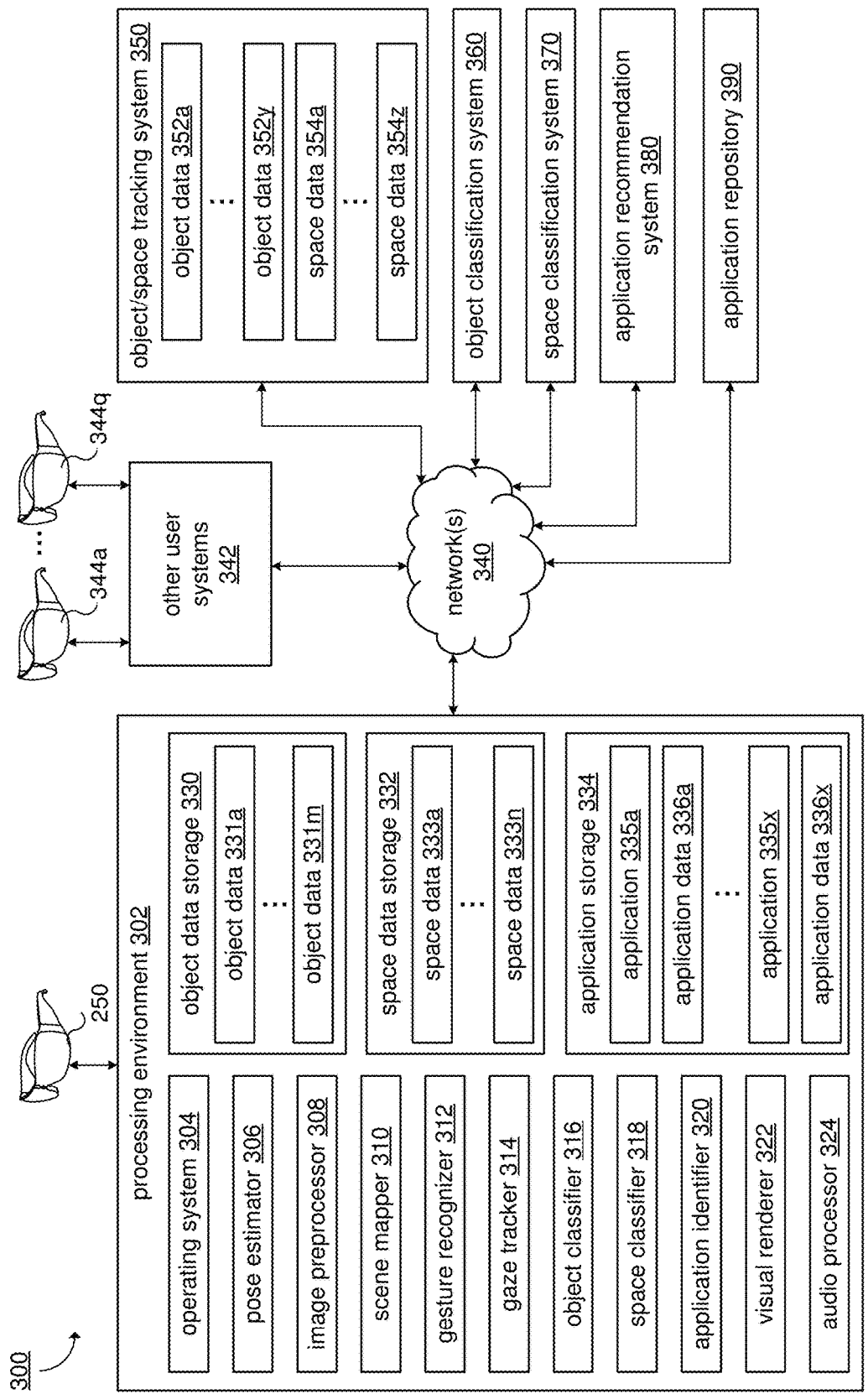
FIG. 3 illustrates a schematic example of a processing environment and related systems for use with the MR device illustrated in FIG. 2.

FIG. 3 illustrates a schematic example of a processing environment 302 and related systems for use with the MR device 250 illustrated in FIG. 2. The system 300 includes the MR device 250 illustrated in FIG. 2. Included in the MR device 250 is a processing environment 302, which illustrates examples of features (which may also be referred to as components or modules) implemented by the MR device 250. In this example, these features are implemented, at least in part, using the controller 110 illustrated in FIG. 1B, including a logic subsystem 112 (arranged to execute program instructions), data holding subsystem 114 (including working memory and storage), and communications subsystem 116 (providing communications with network(s) 340 in this example). The features included in the processing environment 302 may be implemented in full or in part by program instructions executed by the logic subsystem 112 and data stored in the data holding subsystem 116. The processing environment 302 includes an operating system 304 that provides an underlying structure to allow hardware elements, such as the elements illustrated in FIG. 1B, to interact with higher level functions of the illustrated features of the processing environment 302.

Pose estimator 306 is configured to use motion data provided by the motion sensor(s) 160 to estimate a current or future pose of the MR device 250. In some examples, pose estimator 306 may also use image data (including, for example, visual images and/or depth image data) provided by the outward facing image sensor(s) 130 and/or image preprocessor 310. In some examples, pose estimator 306 may also use location data provided by the location subsystem 150. The resulting poses may be, for example, six degree of freedom (6DOF) poses indicating both a 3D position (absolute or relative) and orientation (such as roll, tilt, and pan values), or a matrix including components three 3D vectors respectively indicating a position, a forward direction axis, and an upward direction axis. Examples of pose estimation are described in U.S. Pat. No. 8,711,206 (titled "Mobile Camera Localization Using Depth Maps" and issued on Apr. 9, 2014) and U.S. Patent Application Publication Number US 2012/0306850 (titled "Distributed Asynchronous Localization and Mapping for Augmented Reality" and published on Nov. 19, 2013), both of which are incorporated herein by reference in their entireties.

Image preprocessor 308 is configured to perform initial processing of image data provided by the outward facing image sensor(s) 130 (such as visual image data and/or depth image data) to provide processed image data for use by other features of the processing environment 302 and/or other computer systems such as object identification system 360 and/or space identification system 370. In some examples, image preprocessor 308 may perform filtering, correction, or other preprocessing of image data. In some examples, image preprocessor 308 may segment image data into regions, based on visual and/or depth image data.

Scene mapper 310 is configured to use pose data provided by pose estimator 306 and/or image data provided by the outward facing image sensor(s) 130 and/or image preprocessor 308 to generate a 3D model of a scene observed by the MR device 250, such as portions of the physical space 200 for which image data has been captured by the outward facing image sensor(s) 130. As user 240 moves around the physical space 200, the field of view captured by the outward facing image sensor(s) 130 captures various portions of the physical space 200 at various levels of detail (for example, a higher level of detail might be captured when closer to a real-world object). A portion of the 3D model may be described using a point cloud, which may be continually refined and/or adjusted based on new image data. A portion of the 3D model may be described using object descriptions. For example, after determining relevant characteristics of wall 202, a portion of the 3D model corresponding to wall 202 may be described as one or more 3D shapes and/or surfaces (for example, as a quadrilateral defined by its four corners) instead of a point cloud. For previously analyzed physical spaces, portions of the 3D model can be initially generated based on stored and/or retrieved object data and/or space data. The 3D model may include visual image data associated with various areas of the 3D model, and the scene mapper 310 may be configured to stitch together visual images and/or generate textures and/or color values for 3D points. Scene mapper 310 may maintain higher levels of detail or increase processing resources for portions of the 3D model in which surfaces have been detected for which corresponding objects have not been identified and/or characterized, or portions indicated by the object classifier 316 as being of increased or reduced interest. Scene mapper 310 may be configured to recognize basic 3D surfaces, such as planer surfaces. Portions of the 3D model may be extracted as depth image data for use by other features of the processing environment 302.

In some implementations, the processing environment 302 may include a gesture recognizer 312 configured to use image data provided by the outward facing image sensor(s) 130, image preprocessor 308, and/or scene mapper 310 to recognize hand gestures performed by the user 240. In some implementations, the processing environment 302 may include a gaze tracker 314 configured to use data provided by the gaze detection subsystem 130 to determine gaze directions of each of the eyes of the user 240. Gaze tracker 314 may determine a position that the user 240 is currently looking at and/or a direction in which the user 240 is looking; this determination may be based on pose data provided by pose estimator 306. The determined position and/or direction may be used to identify an area of a scene, a real-world object, or a virtual image that user 240 is visually focused on.

Object classifier 316 is configured to identify and classify real-world objects and determine positions and/or poses of real-world objects in scenes observed by the MR device 250, such as, but not limited to, the real-world objects 210, 220, and 230 found in the physical space 200 illustrated in FIG. 2. The object classifier 316 may also be referred to as an "object identifier," "object identifier/classifier," "real-world object identifier," or "real-world object classifier." Object classifier 316 is configured to use, among other things, image data provided by the outward facing image sensor(s) 130, image preprocessor 308, and/or scene mapper 310. It is noted that classification of real-world objects by the object classifier 316 does not require, and in some implementations does not make use of, visual tags (such as, for example, QR codes or barcodes) or other indicia to be imprinted on or affixed to the real-world objects. An object classification for a real-world object may indicate, expressly or inherently, whether it is a dynamic object or a static object. In the example illustrated in FIG. 3, the object classifier 316 is configured to, via network(s) 340, work in cooperation with a remote object classification system 360 to identify and/or classify real-world objects. In a given embodiment, operations implementing the various techniques described herein for identifying and/or classifying real-world objects may be performed, in whole or in part, by object classifier 316 with resources available in MR device 250 or by the object classification system 360. In some examples, some operations may be selectively performed using resources available in MR device 250 in response to object classifier 316 not being able to communicate with object classification system 360 or bandwidth limitations between object classifier 316 and object classification system 360.

The object classification system 360 is configured to, among other things, receive image data from MR device 250 and identify and/or classify real-world objects that appear in the provided image data. This allows the MR device 250 to take advantage of more sophisticated techniques and/or models, greater amounts of computing power, and greater amounts of data available to the object classification system 360. In some examples, the object classification system 360 may be configured to retrieve space data for a physical space stored in the object/space tracking system 350 to reduce an amount of data transmitted by the MR device 250. In some examples, the object classification system 360 may be configured to store object data for a real-world object in the object/space tracking system 350.

In some implementations, the object classification system 360 is configured to use, among other things, machine learning and inference techniques to identify and/or classify real-world objects based on image data including image data for the real-world objects. For example, the object classification 360 may be configured to perform semantic segmentation or semantic labeling of image data. Machine learning techniques may generate one or more models for identifying and/or characterizing real-world objects based on a corpus of training data in the form of labeled or otherwise previously characterized image data. In some implementations, one or more portions of the training data may be provided via the MR device 250 and/or other user systems, including other MR devices 344a to 344q. The training data may be continually updated and one or more of the models used by the object classification system 360 revised or regenerated to reflect the updates to the training data. In some implementations, the object classifier 316 may be configured to obtain one or more models from the object classification system 360, and use the obtained models to perform real-world object identification and/or classification using resources included in the MR device 250. For example, the MR device 250 may obtain models that are effective for identifying and/or classifying real-world objects that the MR device 250 is expected to encounter.

In some implementations, the object classifier 316 and/or object classification system 360 may be configured to access, receive, and or use other information, in addition to image data, to identify, classify, and/or locate real-world objects. For example, MR device 250 may be arranged to receive and decode various wireless signals generated by or associated with real-world objects, and use the resulting information to determine that a particular real-world object or type of real-world object is in proximity to the MR device 250. For example, an electronic device may broadcast a Wi-Fi, Bluetooth (including a beacon transmission), NFC (near-field communications), RFID (radio frequency identification), or other radio frequency (RF) signal, or may generate an optical (including, for example, modulated infrared light) or an audio (including, for example, audible, infrasonic, and/or ultrasonic sounds) signal, including an identifier such as, but not limited to, a media access control (MAC) address, a universally unique identifier (UUID), a manufacturer identifier, and/or a device model identifier. The MR device 250 may include one or more sensors, receivers, and/or transmitters effective for such wireless signals. Such identifiers may be transmitted to the object classification system 360 for use in addition to, or instead of image data, to identify and/or classify real-world objects. In some examples, the object classifier 316 may identify and/or classify a real-world object as being associated with one or more physical spaces based on wireless signals received by the MR device 250. The object classifier 316 may be configured to, in some circumstances, interact wirelessly with a broadcasting device to obtain more information about or confirm an identity of the broadcasting device. Such interaction may be performed according to information and/or instructions received from object classification system 360. In some implementations, MR device 250 may include a wireless receiver that is arranged to determine a direction of a broadcasting device, such by use of an array receiver. The determined direction may be used to verify or improve an identification and/or classification of a real-world object. In some implementations, MR device 250 may measure a strength of a received wireless signal and, based on the measured strength, estimate a distance to the broadcasting device. The estimated distance may be used to verify or improve an identification and/or classification of a real-world object. In some examples, object classifications associated with real-world objects previously classified by the MR device 250 or another MR device used by the user 240, object classifications associated with nearby real-world objects (classified for user 240 and/or other users), and/or a physical space classification for a physical space in which the MR device 250 is currently located may be used to verify or improve an identification and/or classification of a real-world object. In some examples, text appearing on a real-world object may be processed using optical character recognition and used to automatically identify and/or classify the real-world object. For example, a manufacturer name or a model number may imprinted on a real-world object (including an exterior surface and/or an interior surface, such as inside a door).

In some examples, the object classifier 316 and/or object classification system 360 may be configured to automatically identify additional information that may facilitate an identification or a classification of a real-world object. As a first example, in response to a real-world object receiving a general classification, additional information may be identified that could allow a more specific classification to be obtained for the real-world object. For example, a real-world object may be classified as a generic refrigerator, there may be various more specific classifications of "smart" refrigerator types or models for which software applications are available. The object classifier 316 and/or object classification system 360 may identify additional information useful for determining whether one of the more specific classifications may apply to the real-world object. As a second example, in response to multiple likely classification options being identified for a real-world object, additional information may be identified that could allow a more definitive classification. The object classification system 360 may indicate the identified additional information to object classifier 316, and in response to this indication, the MR device 250 may perform actions to obtain and provide the additional information to the object classification system 360. Examples of the additional information include, but are not limited to, higher resolution image data, image data for currently uncaptured areas of a physical space and/or real-world object, a user selection of an option from a list of options, and/or a user response to a query presented via the MR device 250 (for example, a spoken or text response provided by the user 240).

In another example, a real-world object may be classified as a generic entertainment system, such as a television, gaming console, media hub, social networking or communication device, music player, or other such systems. There may be various more specific classifications of entertainment systems for which software applications are available. The object classifier 316 and/or object classification system 360 may identify additional information useful for determining whether one of the more specific classifications may apply to an entertainment system. For example, if the real-world object is a video game console and television display, the MR device 250 may work in concert with images or other media presented on the display by the video game console in some implementations. In one implementation, a user may view imagery or media being displayed by the video game console through the MR device 250. While viewing the media that is displayed on the television screen, the media images can be augmented by one or more additional points of information by the MR device 250. For example, a user may be watching a sports game on the television while accessing or viewing statistics associated with the game through the holographic display of the MR device 250. In addition, in some implementations, when a user changes position or location during the viewing experience, for example, moving to a different room, a virtual replica of the media being presented on the television screen can be displayed through the MR device 250. In one implementation, the television screen can be virtually displayed to the user as a free-floating graphical element in their field of vision and provide the user with a substantially uninterrupted viewing experience. When the user returns to the television, the MR device 250 may cease display of the media replica.

The object identifier 316 may identify and/or classify a previously identified and/or classified real-world object based on object data stored for the real-world object, allowing MR device 250 to more quickly recognize the same object. The object classifier 316 may, in addition to being used to perform initial identification and/or classification of a currently unidentified and/or uncategorized real-world object, also be used to perform reclassification and/or further classification of an already identified real-world object. The object classifier 316 may be configured to receive and process input received from the user 240 indicating that an object classification is incorrectly associated with a real-world object (which may prompt reclassification of the real-world object) and/or expressly identifying an object classification for the real-world object.

In some examples, the object classifier 316 and/or object classification system 360 may be configured to estimate a pose for a real-world object. For a dynamic object, the object classifier 316 may be configured to perform pose estimation to better achieve real time pose estimation for a moving object. For a static object, it may be suitable for pose estimation to be performed by the object classification system 360. The object classifier 316 is configured to determine a location for an identified and/or classified real-world object.

In some implementations, the real-world objects identified and/or classified by the object classifier 316 may include real-world features such as the walls 202 and 204 and floor 206 illustrated in FIG. 2. Such real-world features may be identified and/or classified according to the various techniques described herein for real-world objects such as real-world objects 210, 220, and 230, or simpler techniques may be used for such real-world features, such as, but not limited to, identification of a large and substantially vertical plane as a wall and/or a large horizontal plane at about an expected foot level of the user 240 as a floor or ground.

Space classifier 318 is configured to identify, classify, and determine boundaries for physical spaces observed by the MR device 250, such as, but not limited to, the physical space 200 illustrated in FIG. 2. Space classifier 318 may also be referred to as a "space identifier," "space identifier/classifier," "physical space identifier," or "physical space classifier." Space classifier 318 is configured to use, among other things, classifications associated with real-world objects identified by the object classifier 316. In some examples, space classifier 318 is also configured to use other object data, such as a location and/or pose of a real-world object. A presence or lack of real-world objects associated with certain object classifications, either alone or in combination with real-world objects associated, or not associated, with other classifications, may strongly correlate with a physical space classification. For example, a physical space including real-world objects respectively classified as a refrigerator, microwave, and sink may be determined to have a significant probability of being a kitchen, and this probability may be further increased by a lack of real-world objects classified as beds, couches, or coffee tables. The space classifier 318 may generate an initial boundary for a physical space and continue to refine that boundary over time based on additional image data captured by the MR device 250, including classifications by the object classifier 316 based on such image data.

In some examples, the space classifier 318 may be configured to use dimensions and/or shapes of physical spaces, calculated from boundaries determined by the space classifier 318 itself, for classification of physical spaces. For example, some closets may be recognized based on their small size. In some examples, a first physical space may be classified based on one or more space classifications associated with one or more physical spaces that include the first space, are included in the first space, and/or overlap the first space. Classification of a physical space may be based on dimensions, numbers, types, and/or placements of walls, doors, windows, and other relatively fixed features; a type of floor surface (for example, carpet, hardwood, tile, or laminate); colors of features such as, but not limited to, walls, ceilings, wall hangings, curtains, furniture, and/or appliances. In some examples, a boundary or a physical space may be determined based on which locations user 240 spends time in and which objects are used over a period of time. Various techniques described above for verifying or improving an identification and/or classification of a real-world object may similarly be applied for classifying physical spaces. The space classifier 318 may identify and/or classify a previously identified and/or classified physical space based on space data stored for the physical space, allowing MR device 250 to more quickly recognize the same physical space.

In the example illustrated in FIG. 3, the space classifier 318 is configured to, via network(s) 340, work in cooperation with a remote space classification system 370 to identify, classify, and determine boundaries for physical spaces. In a given embodiment, operations implementing the various techniques described herein for identifying, classifying, and determining boundaries for physical spaces may be performed, in whole or in part, by space classifier 318 with resources available in MR device 250 or by the space classification system 370. In some examples, some operations may be selectively performed using resources available in MR device 250 in response to space classifier 318 not being able to communicate with space classification system 370 or bandwidth limitations between space classifier 318 and space classification system 370.

The space classification system 370 is configured to, among other things, receive object data for real-world objects located in a physical space, including, but not limited to, classifications associated with the real-world objects, locations of the real-world objects, and/or poses of the real-world objects, and use the received object data to identify, classify, and/or determine boundaries for the physical space. This allows the MR device 250 to take advantage of more sophisticated techniques and/or models, greater amounts of computing power, and greater amounts of data available to the space classification system 370. In some examples, the space classification system 370 may be configured to retrieve object data for a real-world object stored in the object/space tracking system 350 to reduce an amount of data transmitted by the MR device 250. In some examples, the space classification system 370 may be configured to store space data for a physical space in the object/space tracking system 350.

In some implementations, the space classification system 370 is configured to use, among other things, machine learning and inference techniques to identify, classify, and/or determine boundaries of physical spaces. Machine learning techniques may generate one or more models for identifying, classifying, and/or determining boundaries of physical spaces based on a corpus of training data, one or more portions of which may be provided via the MR device 250 and/or other user systems, including other MR devices 344*a* to 344*q*. The training data may be continually updated and one or more of the models used by the space classification system 370 revised or regenerated to reflect the updates to the training data. In some implementations, the space classifier 318 may be configured to obtain one or more models from the space classification system 370, and use the obtained models to identify, classify, and/or determine boundaries of physical spaces using resources included in the MR device 250. For example, the MR device 250 may obtain models that are effective for identifying, classifying, and/or determining boundaries of physical spaces that the MR device 250 is expected to encounter.

Application identifier 320 is configured to identify one or more software applications for augmenting a real-world object based on object classifications associated with the real-world object. The application identifier 320 may also be referred to as a "software application identifier." In some examples, the identification may be based on space classifications associated with a physical space in which the real-world object is included. In some examples, the identification may be based on user history data for the user 240 and/or other users. Example items of user history data include, but are not limited to, a total amount of time a software application has been associated with a real-world object, a total amount of time a software application has been actively used with a real-world object, and/or object classifications associated with real-world objects with which a software applications has been associated or actively used. In the example illustrated in FIG. 3, the application identifier 320 is configured to, via network(s) 340, work in cooperation with a remote application recommendation system 380 to identify software applications for augmenting a real-world object. In a given embodiment, operations implementing the various techniques described herein for identifying software applications for augmenting real-world objects may be performed, in whole or in part, by application identifier 320 or by the application recommendation system 380. In some examples, software applications identified by application identifier 320 may be downloaded by the MR device 250 from application repository 390 via network(s) 340. In some implementations, the application repository 390 may include an "app store" configured to allow user 240 to purchase selected software applications. Although only one application repository 390 is illustrated in FIG. 3, in some examples, software applications identified by application identifier 320 may be obtained from a plurality of such application repositories.

In some examples, application identifier 320 and/or application recommendation system 380 may be similarly configured to identify one or more software applications for augmenting a physical space based on space classifications associated with the physical space. In some implementations, a physical space may be associated with a software application, and a virtual interface provided by the application may be tethered to a location or object within the physical space. For example, a virtual interface may be displayed to user 240 while the user 240 is in a particular physical space. In one implementation, an application can be associated with a kitchen, and the application configured to provide virtual interfaces that relate to the functionality of the kitchen (e.g., recipes, measurement unit conversion calculator, shopping list, inventory list, map showing where ingredients or items are stored, etc.). In one implementation, a virtual interface provided by an application associated with a physical space can be displayed during an entire period that the user 240 is in the physical space, or can be alternatively be readily accessed by a shortcut option. Furthermore, in other implementations, there may be a general, comprehensive, or overall virtual interface available to the user 240 upon entering their own home, established residence, workplace, or other frequently visited physical space. The general virtual interface can be displayed during the entire period that the user 240 is in the building or area, or can be easily accessed by a shortcut option.

The application recommendation system 380 is configured to, among other things, receive object data for real-world objects, including, but not limited to, classifications associated with the real-world objects, and use the received object data to identify software applications for augmenting the real-world objects. This allows the MR device 250 to take advantage of more sophisticated techniques and/or models, greater amounts of computing power, and greater amounts of data available to the application recommendation system 380. In some examples, the application recommendation system 380 may be configured to retrieve object data for a real-world object and/or space data for a physical space including the real-world object stored in the object/space tracking system 350 to reduce an amount of data transmitted by the MR device 250. In some implementations, the application recommendation system 380 is configured to use, among other things, machine learning and inference techniques to identify software applications for augmenting the real-world objects.

Visual renderer 322 is configured to render virtual graphical elements using the display subsystem 120 included in the MR device 250, which can include instances of three dimensional holographic virtual objects, two dimensional images, colors and other information using the display subsystem 120. Visual renderer 322 works in conjunction with software applications associated with real-world objects render virtual graphical elements for display to the user 240. Processing environment 302 may include an audio processor 324 configured to process sounds received by microphone(s) 170, and/or generate sounds output by speaker(s) 180. In some examples, audio processor 324 may be configured to, with or without assistance from a remote system via network(s) 340, perform voice recognition of commands or responses spoken by user 240. In some examples, audio processor 324 may be configured to, with or without assistance from a remote system via network(s) 340, perform generate speech to provide information, instructions, and or queries to user 240.

Processing environment 302 includes an object data storage 330 configured to store a plurality of object data 331*a* to 331*m* associated with a plurality of respective real-world objects. Portions of object data 331*a* to 331*m* may have been generated by object classifier 316, space classifier 318, and/or application identifier 320. Portions of object data 331*a* to 331*m* may have been retrieved from object/space tracking system 350 (for example, from one or more of the object data 352*a* to 352*y* stored therein) via the network(s) 340. Object data for a real-world object may include, but is not limited to, object classifications associated with the real-world object, a location of the real-world object, an estimated pose for the real-world object, one or more software applications identified by application identifier 320 for the real-world object, an identifier for a physical space in which the real-world object is located, one or more software applications currently associated with the real-world object, and/or application data generated by one or more software applications associated with the real-world object.

Processing environment includes a space data storage 332 configured to store a plurality of space data 333*a* to 333*n* associated with a plurality of respective physical spaces. Portions of space data 333*a* to 333*n* may have been generated by object classifier 316, space classifier 318, and/or application identifier 320. Portions of space data 333*a* to 333*n* may have been retrieved from object/space tracking system 350 (for example, from one or more of the space data 354*a* to 354*y* stored therein) via the network(s) 340. Space data for a physical space may include, but is not limited to, space classifications associated with the physical space, a location of the physical space, one or more boundaries of the physical space, identifiers for real-world objects included in the physical space, one or more software applications identified by application identifier 320 for the physical space, one or more software applications currently associated with the physical space, and/or application data generated by one or more software applications associated with the physical space.

Object data and/or portions of object data may be exchanged between MR device 250 and object/space tracking system 350. Space data and/or portions of object data may be exchanged between MR device 250 and object/space tracking system 350. In some examples, object data may be moved in or out of object data storage 330 in response to a location of the MR device 250 and/or the MR device 250 entering and/or leaving a physical space. In some examples, space data may be moved in or out of object data storage 330 in response to a location of the MR device 250. In some examples or circumstances, portions of object data 352*a* to 352*y* and/or portions of space data 354*a* to 354*z* generated by other user systems 342, such as MR devices 344*a* to 344*q*, may be retrieved by MR device 250. The object/space tracking system 350 may be configured to implement access control mechanisms and policies to restrict or otherwise control sharing of object data and/or space data among various users, groups of users, and/or organizations.

Application storage 334 is configured to store software applications 335*a* to 335*x* for execution on the MR device 250. The stored software applications 335*a* to 335*x* may include software applications associated with real-world objects. Application storage 334 may be further configured to store application data 336*a* to 336*x* for respective software applications 335*a* to 335*x*. Application data may include identifiers for one or more real-world objects associated with an application. Application data may include data for individual real-world objects associated with a software application.

Network(s) 340 includes one or more data communication networks allowing data to be communicated between MR device 250 and object/space tracking system 350, object classification system 360, space classification system 370, application recommendation system 380, and/or application repository 390. Network(s) 340 may include, for example, the Internet, an internet service provider (ISP) connection, a local wired or wireless network (such as, but not limited to, Wi-Fi or Ethernet), a short range wireless network (such as, but not limited to, Bluetooth), and/or an internal network connecting two or more of object/space tracking system 350, object classification system 360, space classification system 370, application recommendation system 380, and/or application repository 390.

It is noted that in other embodiments, the various functions described above for system 300 may be implemented by different systems than illustrated in FIG. 3. For example, some of the functions described as being performed by the object identification system 360, such as using model data 366 to identify objects and/or storing unidentified object data 368, may be performed within the processing environment 302.

Figure 4:
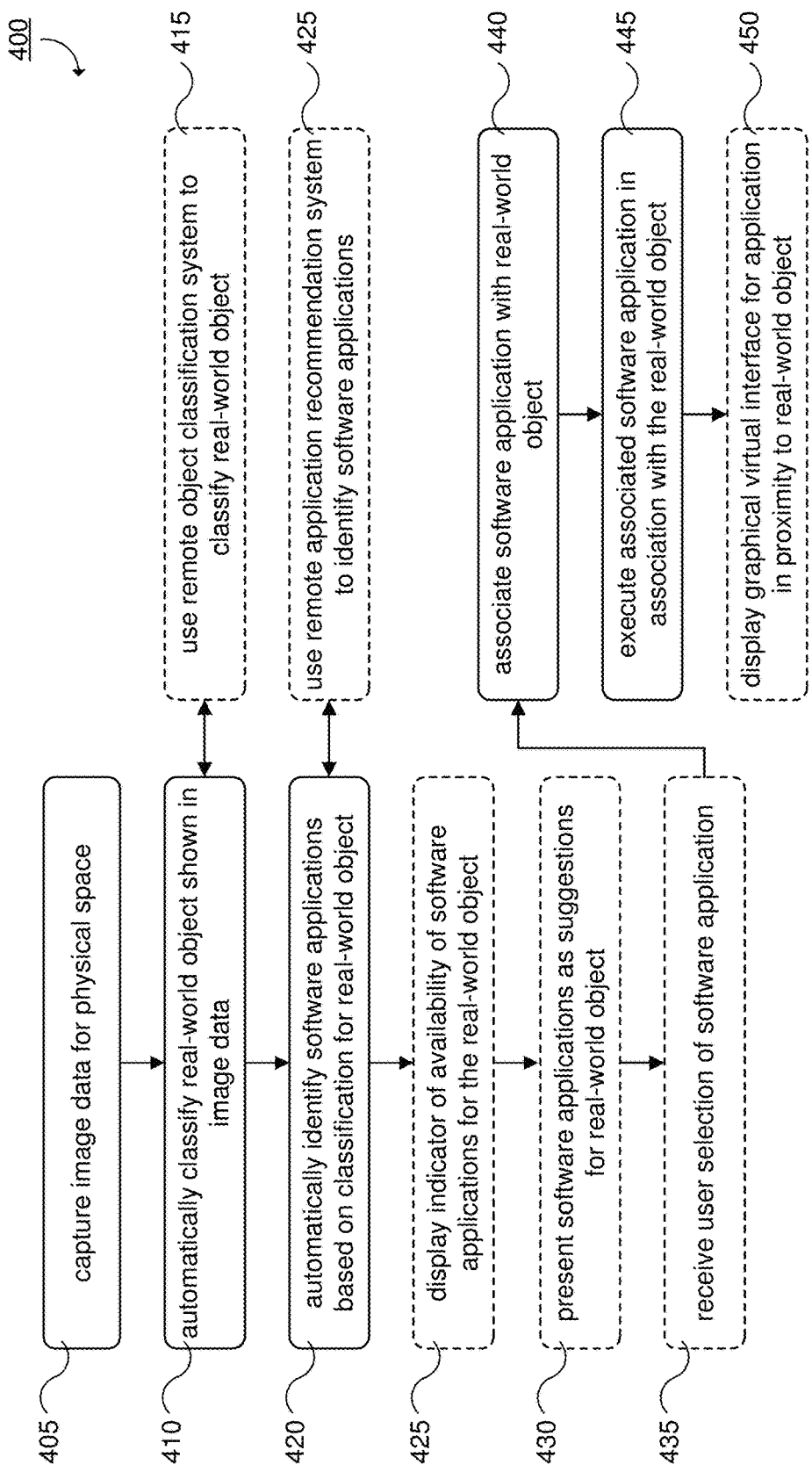
FIG. 4 illustrates examples of methods and/or processes for augmenting real-world objects using software applications executing on an MR device.

FIG. 4 illustrates examples of methods and/or processes for augmenting real-world objects using software applications executing on an MR device. The methods and/or processes illustrated in FIG. 4 may be implemented using the various devices, systems, elements, and features described above in connection with FIGS. 1A-3. At step 405, an MR device captures image data for a physical space. For example, this may be performed as described above in connection with outward facing image sensor(s) 130, image preprocessor 308, and scene mapper 310. At step 410, the MR device automatically classifies a real-world object that is shown in the image data captured in step 405. For example, this may be performed as described above in connection with object classifier 316. In some examples, step 410 may include a substep 415 in which a remote object classification system is used to classify the real-world object. For example, this may be performed as described above in connection with object classification system 360.

At step 420, the MR device automatically identifies one or more software applications based on one or more classifications associated with the real-world object at 410. For example, this may be performed much as described above in connection with application identifier 320. In some examples, step 420 may include a substep 425 in which a remote application recommendation system is used to identify one or more of the software applications. For example, this may be performed as described above in connection with application identifier 320. In some examples, after step 420, a step 425 may be performed in which a visual indicator is displayed to the user of the MR device that one or more software applications have been identified for augmenting the real-world object. In some examples, after step 425, a step 430 may be performed in which some or all of the software applications identified at step 420 are presented to a user of the MR device as suggestions and/or options for augmenting the real-world object via the MR device. The step 430 may be performed in response to a user interacting with the real-world object via the MR device, and/or the user interacting with the visual indicator displayed at 425.

After step 430, at step 435 the MR device may receive a user selection of one of the software applications automatically identified by the MR device and presented at step 430. In some examples, this may result in the software application being downloaded and installed on the MR device, such as by downloading the software application from the application repository 390 illustrated in FIG. 3. At step 440, such as after step 435, the MR device associates a software application identified at step 420 with the real-world object. For example, a software application selected at step 435 may be associated with the real-world object at step 440. At step 445, the software application associated with the real-world object at step 440 is executed on the MR device in association with the real-world object. In some examples, at step 450 the software application executed at 445 may display a graphical virtual interface via the MR device so as to appear to be located in proximity to the real-world object. The various techniques described below in connection with FIGS. 5-14 may be used in conjunction with the steps illustrated in FIG. 4, and aspects of the techniques described in connection with FIGS. 5-14 may be implemented using techniques described in connection with FIGS. 1-4.

Figure 5:
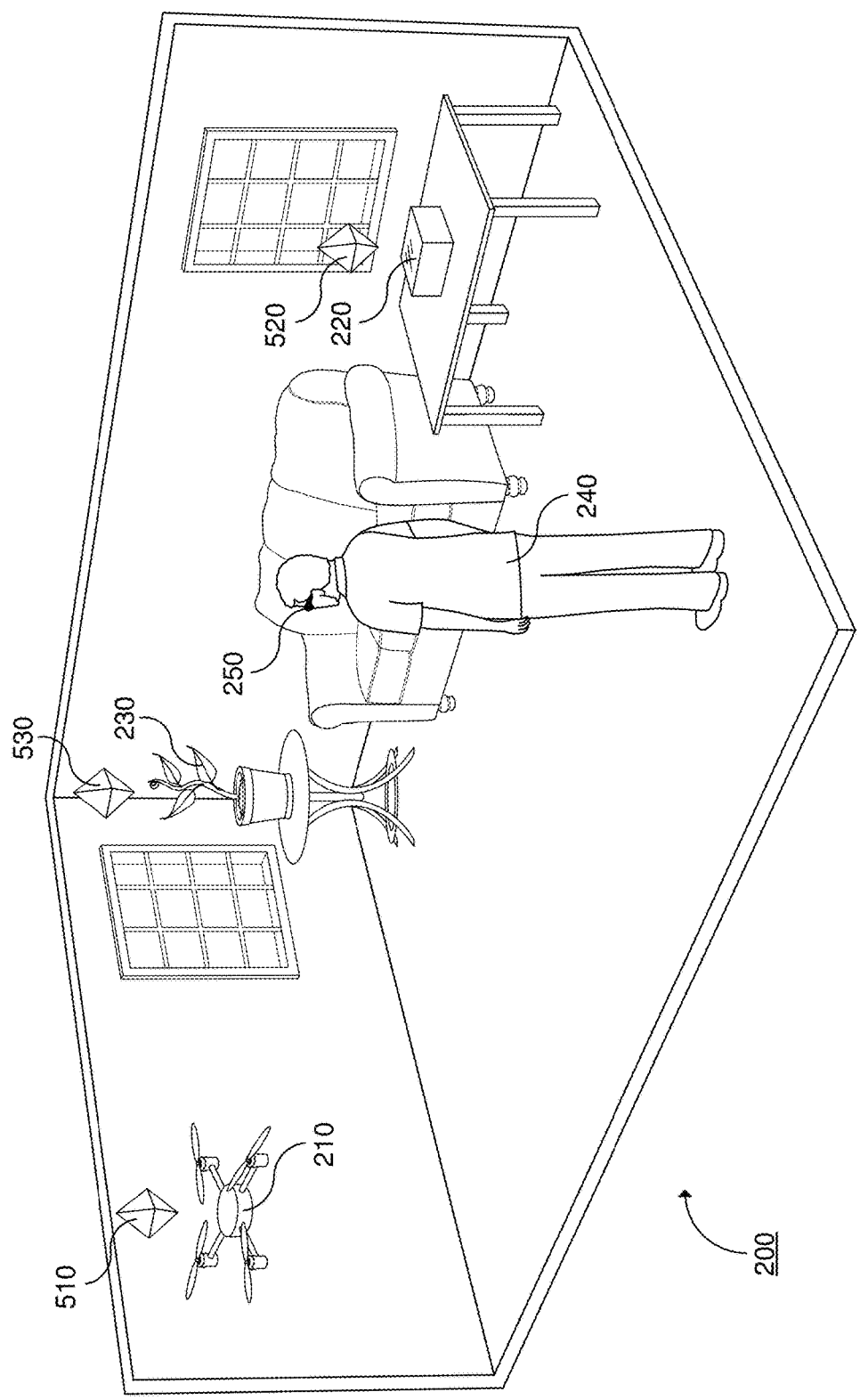
FIG. 5 illustrates an example of a user wearing an MR device while in a physical space with a plurality of real objects, where visual indicators are displayed to the user for some of the real objects.

In different implementations, once the MR device 250 has determined if any of the objects present in the physical space 200 have been classified, the MR device 250 can initiate a second process. It is noted that this second process may be performed at a time that an object has been identified as present, but not yet classified. FIG. 5 illustrates an example in which the MR device 250 illustrated in FIG. 2 has identified and classified each of the first real-world object 210, the second real-world object 220, and the third real-world object 230. Additionally, the MR device 250 has automatically identified one or more software applications for each of the real-world objects 210, 220, and 230 based on their respective object classifications. As illustrated in FIG. 5, in some implementations, a visual indicator may then be displayed to the user 240 proximate to each real-world object for which one or more software applications have been automatically identified and which have not been associated with a software application. For example, an icon, halo around a real-world object, notification, light, and/or other virtual image or series of images (for example, for an animation sequence) may be displayed via the MR device 250, and/or a sound may be output by the MR device 250. One implementation is illustrated by the three holographic octahedral indicators 510, 520, and 530 in FIG. 5, where a first visual indicator 510 is associated with the first real-world object 210 and displayed via the MR device 250 so as to appear to the user 240 to be proximate to the first real-world object 210, a second visual indicator 520 is associated with the second real-world object 220 and displayed in a similar manner proximate to the second real-world object 220, and a third visual indicator 530 is associated with the third real-world object 230 and displayed in a similar manner proximate to the third real-world object 230. Each of the visual indicators can act as a notification to the user 240 that one or more software applications have been automatically identified for augmenting the associated real-world object.

Thus, in different implementations, once a real-world object has been classified by the MR device 250 and one or more software applications identified for augmenting the real-world object, the user 240 can choose whether to initiate a process of selecting a software application to be associated with the real-world object. In some implementations, a visual indicator itself can be a type of user interface, such that a gesture or other movement by the user 240 toward or on the visual indicator can inform the MR device 250 that a software application selection interface should be displayed to the user 240, or alternatively, that the visual indicator should not be displayed (for example, if the user 240 is not currently interested in augmenting the real-world object associated with the visual indicator). In other implementations, the user 240 can provide other types of input, such as voice instructions or gaze-related command input (such as focusing on a real-world object or associated visual indicator for a predetermined amount of time), and/or the initial visual indicator may not be displayed. Furthermore, it should be understood that in some other implementations or circumstances, rather than displaying a visual indicator for a real-world object, the MR device 250 may, in response to the real-world object being classified, automatically associate a software application with the real-world object (for example, a default software application) and/or automatically execute the software application in association with the real-world object without requiring input from the user 240. In some cases, a software application associated with a real-world object may be automatically executed in response to a determination that the user 240 intends to interact with the real object. In another implementation, a request for additional information may be displayed to the user 240, permitting the user 240 to collect additional image data using the MR device 250 (for example, previously uncaptured areas or surfaces of a real-world object and/or physical space) to be used for classification, choose from multiple classification options, and/or provide additional information regarding a real-world object. The additional information may be effective for allowing a real-world object to be classified.

In some implementations, once a software application has been associated with a real-world object (whether selected by user 240 or automatically selected by the MR device 250), the user 240 can subsequently associate a different or alternative software application that is available for the real-world object. In some implementations, the user 240 may expressly identify a particular software application to be associated with a real-world object, even if the identified software application was not automatically identified based on the object classifications associated with the real-world object. In some implementations, more than one software application can be associated with a real-world object.

Figure 6:
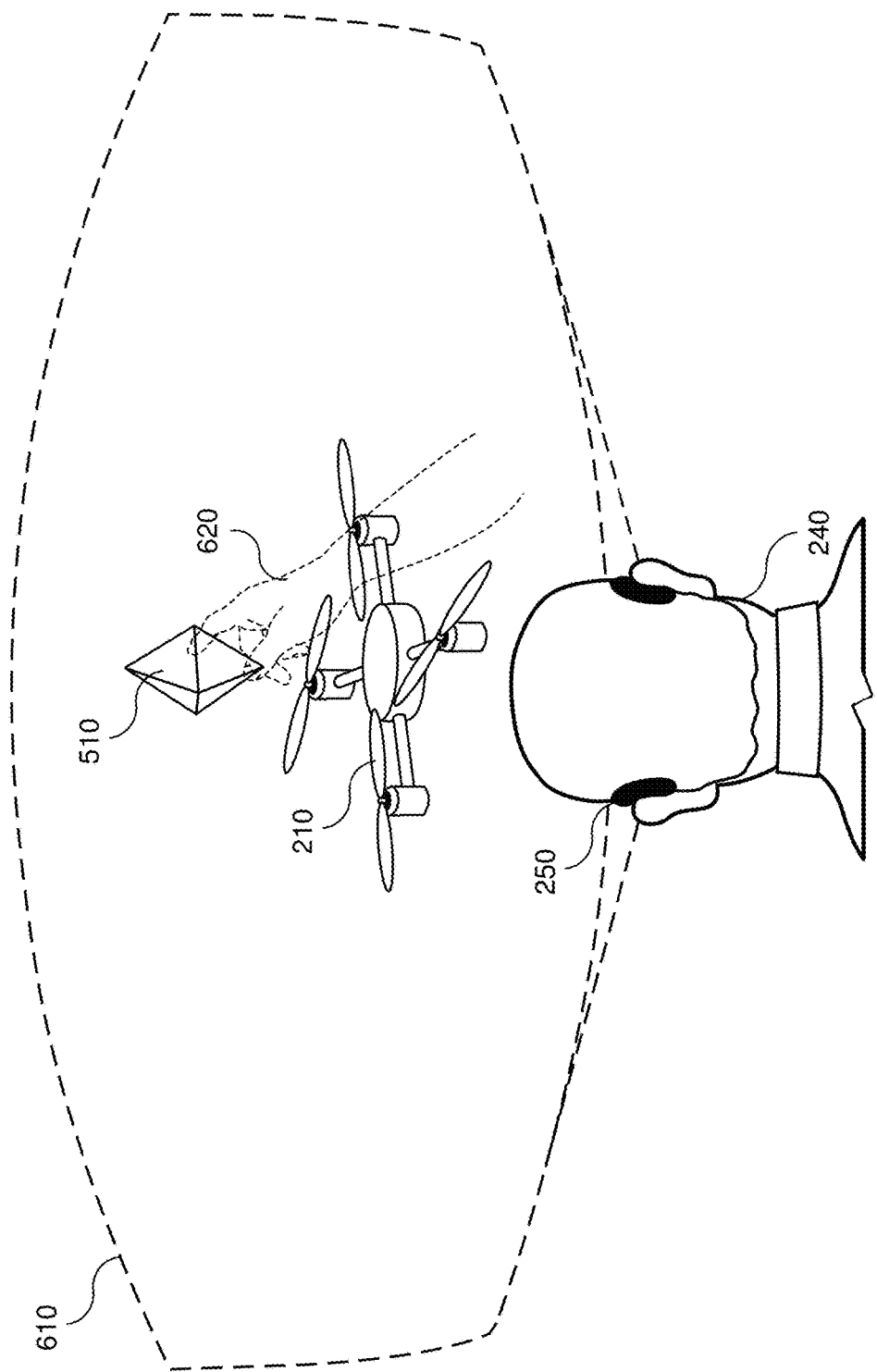
FIG. 6 illustrates an example of a user selecting an object with an indicator.
Figure 7:
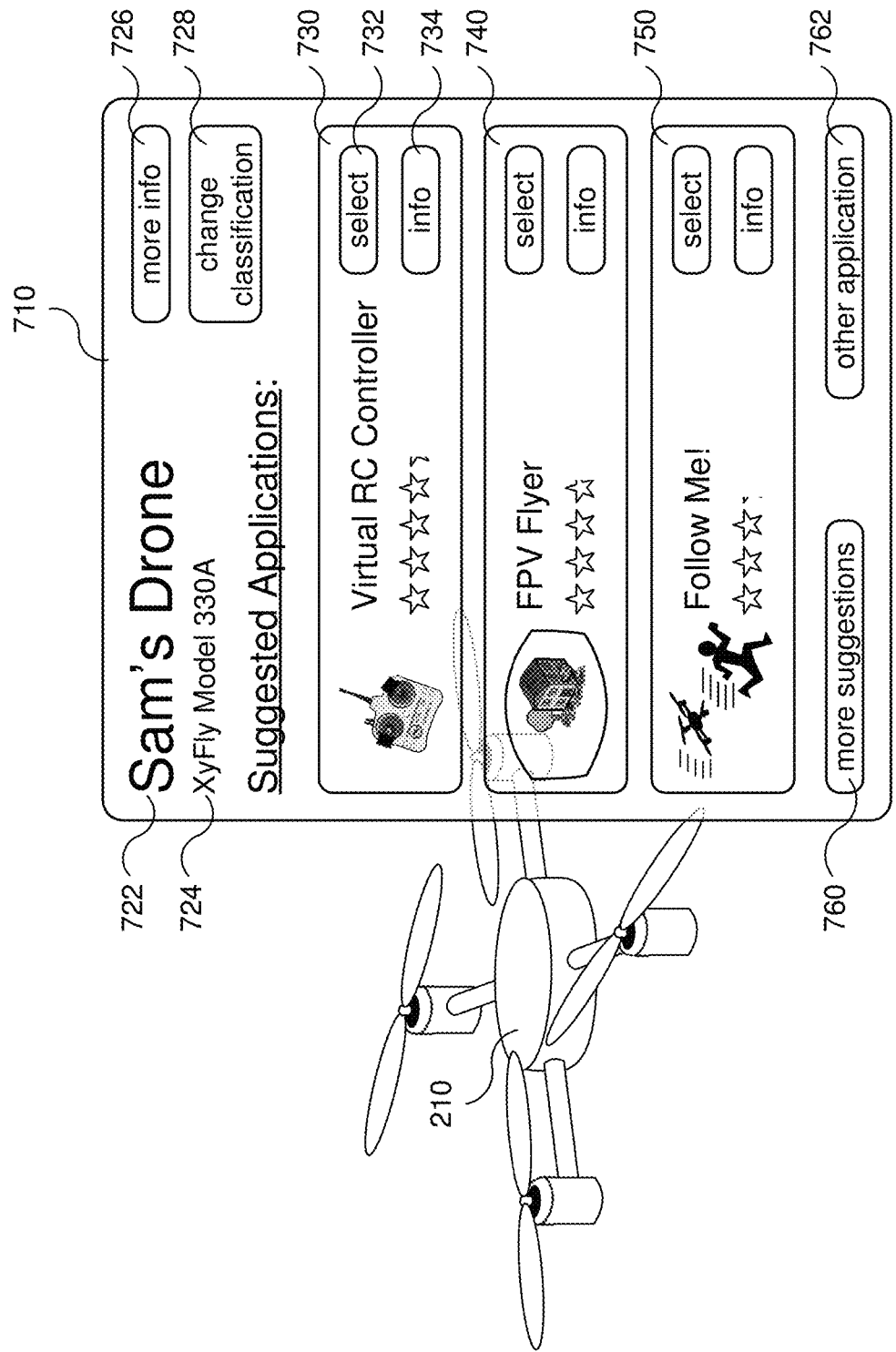
FIG. 7 illustrates an example of a virtual menu being displayed to a user.
Figure 8:
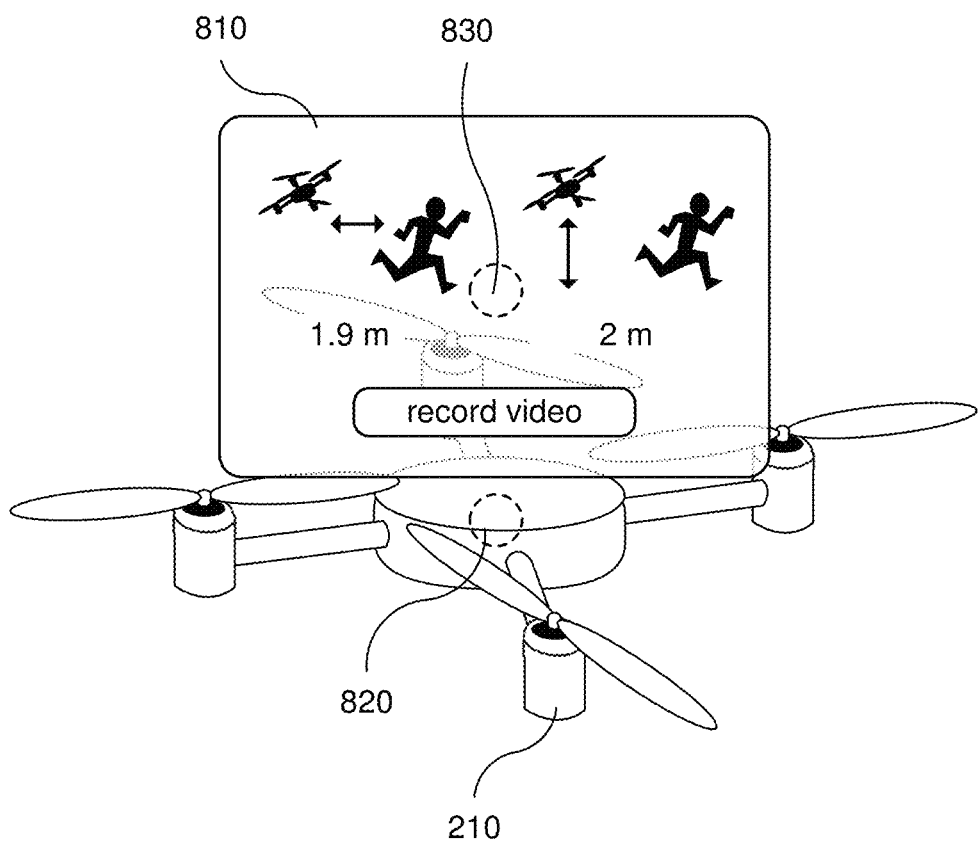
FIG. 8 illustrates an example of a software application being displayed to a user.

In order to provide the reader with a greater understanding of the process and systems described herein, FIGS. 6-8 illustrate an implementation of an example series of steps in which a software application is associated with a real-world object. In FIG. 6, the user 240 can select an object—here first real-world object 210—for interaction or manipulation. In one implementation, the user 240 can engage or interact manually with first indicator 510, for example by pressing or pushing against the displayed indicator with a hand 620 (illustrated by dotted lines). However, in other implementations, other gestures or input types as described herein may be provided by the user 240 and accepted by the MR device 250. In an optional step shown in FIG. 7, a virtual menu 710 is displayed to the user 240. The virtual menu 710 can comprise various options, including but not limited to access to a software application source, listing, or store, information about the object and/or about the classification that was made by the system, an opportunity to correct or adjust the classification of the object, instructions on how to use the various features of the system, label(s), a keyboard to enter queries or request additional information, a voice interface to speak commands to the menu, options to turn off the first indicator 510, change the indicator type or visual associated with the first indicator 510, select a software application associated with the first real-world object 210 (for example, in a drop-down menu or a search), and/or other options. In the example shown in FIG. 7, the virtual menu 710 includes a plurality of options and/or information. In one implementation, the virtual menu 710 includes a first label 722 (here "Sam's Drone") and a second label 724 (here "XyFly Model 330A"), where each can be a default label or inputted by the user 240. In addition, the virtual menu 710 can include a first button 726 comprising an option to access more information, and a second button 728 comprising an option to change the classification presently associated with the object. The virtual menu 710 can also display one or more suggested software applications, such as a first suggested application 730, a second suggested application 740, and a third suggested application 750, as well as a third button 760 to display other suggestions and/or a fourth button 762 to allow the user 240 to search for other software applications.

Referring now to FIG. 8, the user 240 has confirmed or selected a software application for use with the first real-world object 210. In FIG. 8, the indicator is no longer visible, and instead a graphical virtual interface of a first software application 810 is displayed graphically to the user 240. In one implementation, the first software application 810 can comprise a graphical virtual interface that is associated with the understood functioning of the first real-world object 210, based on the classification and identification of the object by the system. In other words, first software application 810 can be configured to project or display any interface or visual representation that is understood to have a working relationship with the particular object selected. Thus, first software application 810 is presented to the user 240 based upon an association of the first software application 810 with the real object.

Furthermore, it should be understood that in some implementations, when first software application 810 is launched, graphical element(s) of the first software application 810 can be configured to remain connected, attached, linked, anchored, or otherwise tethered to the object. Thus, in different implementations, as the user 240 moves through the environment, the graphical elements of the first software application 810 remains in the proximity or vicinity of the first real-world object 210. In some implementations, the graphical elements—such as a graphical virtual interface—for the software application can be understood to be substantially fixed in space relative to the object to which it is associated. As the user 240 moves away, the graphical virtual interface of the software application remains keyed or tethered to the object. When the object is no longer in the field of vision displayed to the user 240 via the MR device 250, the graphical virtual interface of the software application may not be displayed to the user 240. However, when the user 240 returns to view the object, the graphical virtual interface of the software application will again be visible in proximity to or upon the object.

For example, in some implementations, a graphical virtual interface of the first software application 810 can 'hover' above the first real-world object 210, adjacent to the first real-world object 210, and/or be transposed on a portion of first real-world object 210. In one implementation, the graphical virtual interface of the first software application 810 is relatively stationary and can be substantially fixed such that the user 240 fully views the graphical virtual interface of the first software application 810 only when the user 240 is viewing the first real-world object 210 from a particular perspective, and has a more limited view of graphical virtual interface of the first software application 810 from other perspectives. However, in other implementations, the graphical virtual interface of the first software application 810 can be dynamic and rotate or otherwise adjust its position or orientation relative to the first real-world object 210 in order to be visible and accessible to the user 240 across multiple perspectives of the first real-world object 210. In the example of FIG. 8, first real-world object 210 has a first object position 820 and the graphical virtual interface of the first software application 810 has a first interface position 830. In some implementations, the MR device 250 can be configured to present the graphical element(s) at a particular or average distance or range from the object. In addition, in some implementations, the graphical virtual interface of the first software application 810 can be keyed to appear only when the user 240 is within a specified distance from the first real-world object 210, or when at least a significant portion of the first real-world object 210 is visible. In some cases, a graphical virtual interface of the first software application 810 can change in size as a position of the user 240 relative to the object changes. For example, a graphical virtual interface of the first software application 810 may decrease in size, perceptibility, discernibility, brightness, or other features as the user 240 moves further away from the first real-world object 210. Similarly, a graphical virtual interface of the first software application 810 may increase in size, perceptibility, discernibility, brightness, or other features as the user 240 moves closer to the first real-world object 210. In some implementations, the MR device 250 can be configured to emit an auditory or vibratory notification to the user 240 when the MR device 250 is within a specified distance of the object and its associated graphical element(s). In other implementations, the actual position or display or other settings of the first software application 810 can be adjusted by the user 240 to accommodate their preferences.

While FIGS. 6-8 present one implementation of an association process of a software application to an object, it should be understood that the process can vary in other implementations. For example, in one implementation, the user 240 may be able to proceed directly from the indicator (FIG. 6) to a graphical virtual interface (FIG. 8) without interacting with a virtual menu (FIG. 7). Thus, in some cases, the user 240 can indicate (manually, via gestures, via voice, via gaze, or other such input) an instruction to the system to immediately present the default associated software application for the object without interaction with any other options or steps. In addition, as noted above, in some implementations, the user 240 may be able to skip directly to a display of an associated software application for an object without the presentation of an indicator (FIG. 6) or a menu (FIG. 7).

In different implementations, it should be understood that subsequent interactions or views of the objects by the user 240 with the MR device 250 after the initial classification process will be remembered or stored by the MR device 250. Thus, when the user 240 returns to the classified object, an associated software application will be automatically presented to the user 240. In addition, in some implementations, the associated software application can store the settings that were inputted during previous interactions and recall them in subsequent interactions. In one implementation, frequent commands or settings selected by the user 240 may be preferentially displayed or provided as a "Quick Start" option on the software application. In addition, in some implementations, the coordinates or location of an object can be used by the MR device 250 to assist in more quickly determining whether an object is the same object that was previously classified by the system. In other words, the MR device 250 will identify the object and store information related both to the object and the physical space surrounding the object. In one implementation, the MR device 250 may analyze and identify an object, and also analyze and process the environmental context of the object. For example, if an object is a television, the MR device 250 may classify the object as a television, as well as classify the spatial position of the television by mapping its presence relative to neighboring or adjacent items. The television may be disposed on a table, for example, and the table may have specific dimensions and coloring. The table's dimensions and coloring can provide the MR device 250 with increased confidence when the user 240 again views the object that this object is the same television that was identified earlier, and that the associated software application should be displayed to the user 240. In other implementations, any aspect of the environment surrounding the object can be used by the MR device 250 to help determine whether an object has been previously classified and/or to display the appropriate associated software application(s).

Figure 9:
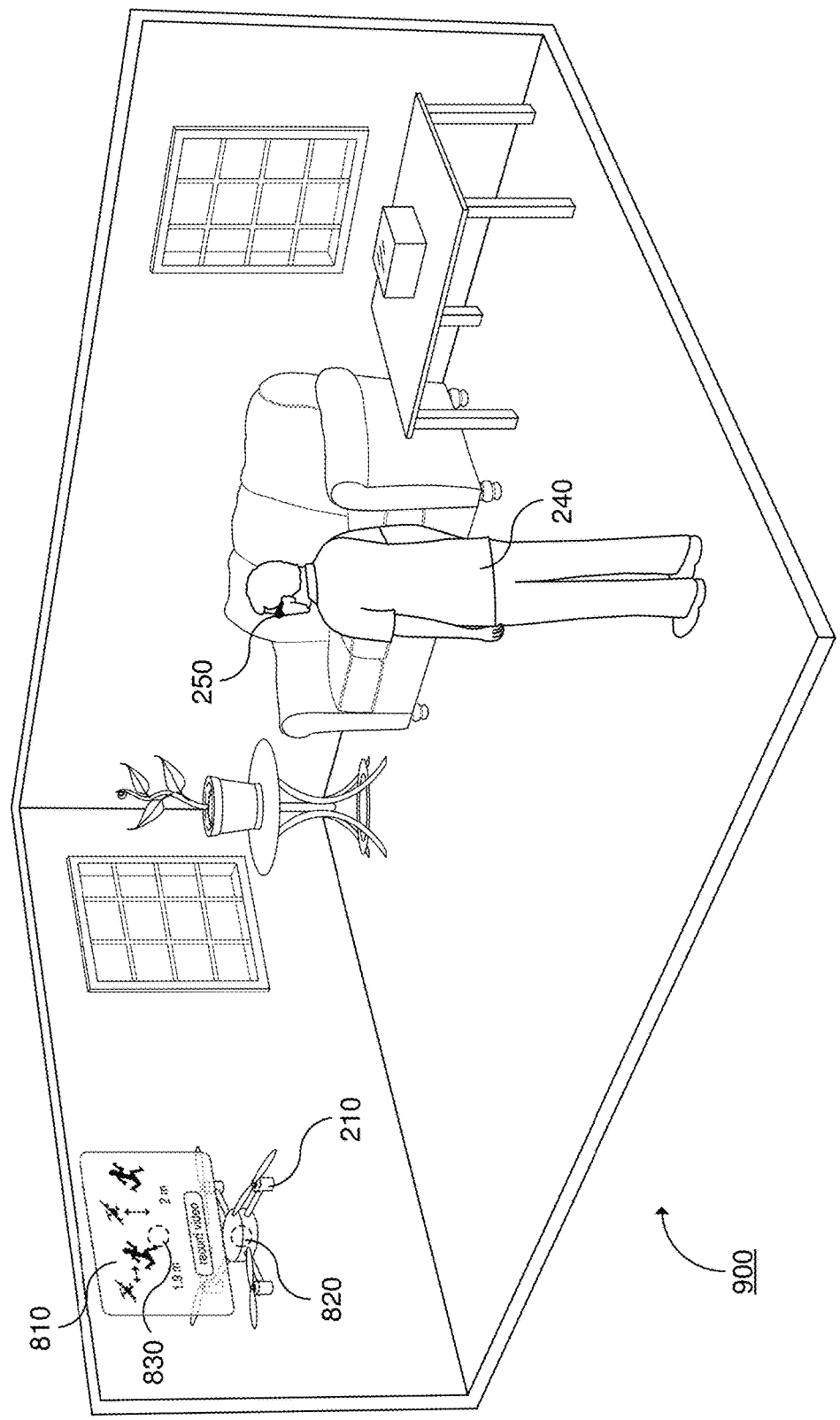
FIG. 9 illustrates an example of a first object in a first position with a graphical virtual interface provided by a software application associated with the first real-world object.
Figure 10:
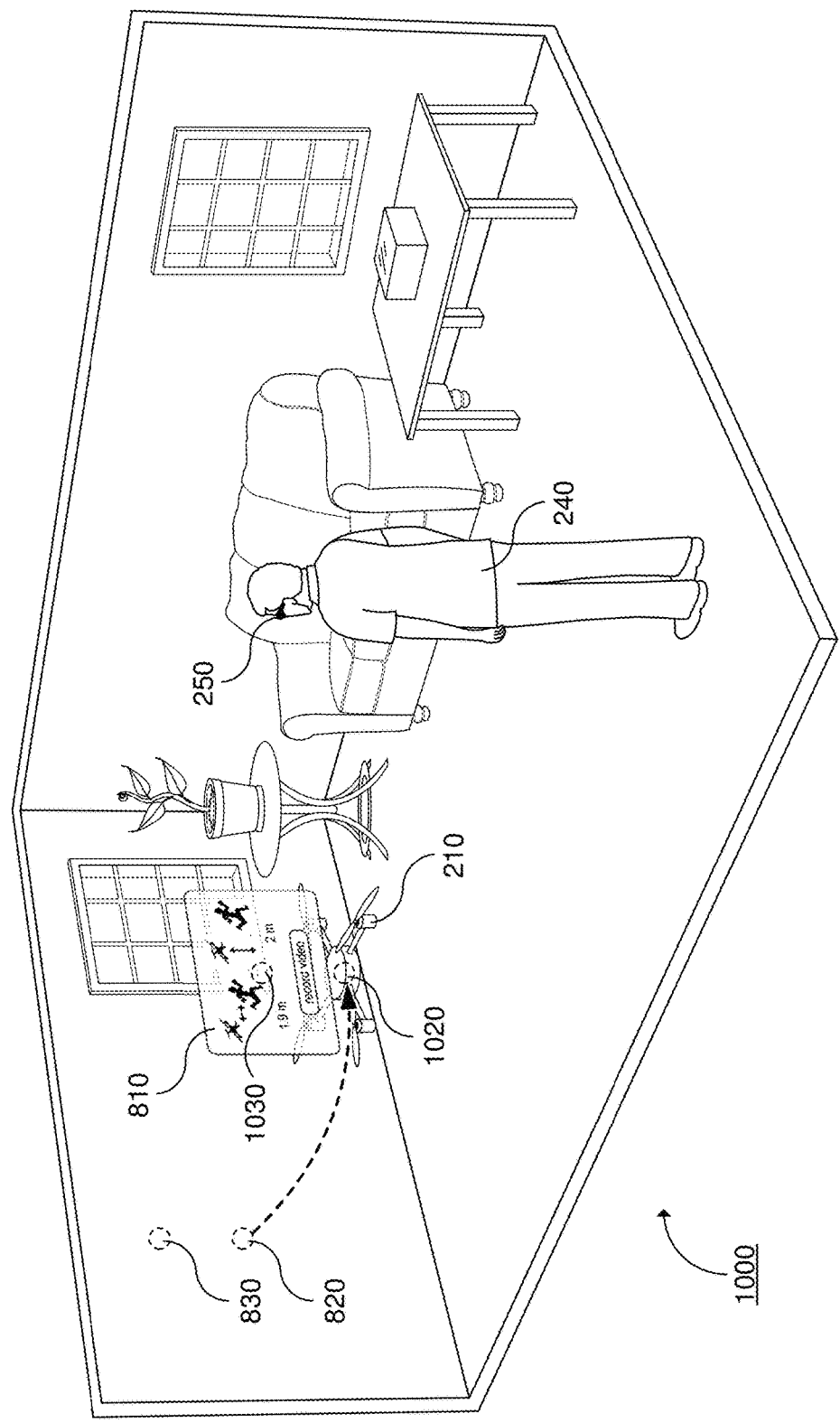
FIG. 10 illustrates an example of the first object shown in FIG. 9 in a second position with its graphical virtual interface.
Figure 11:
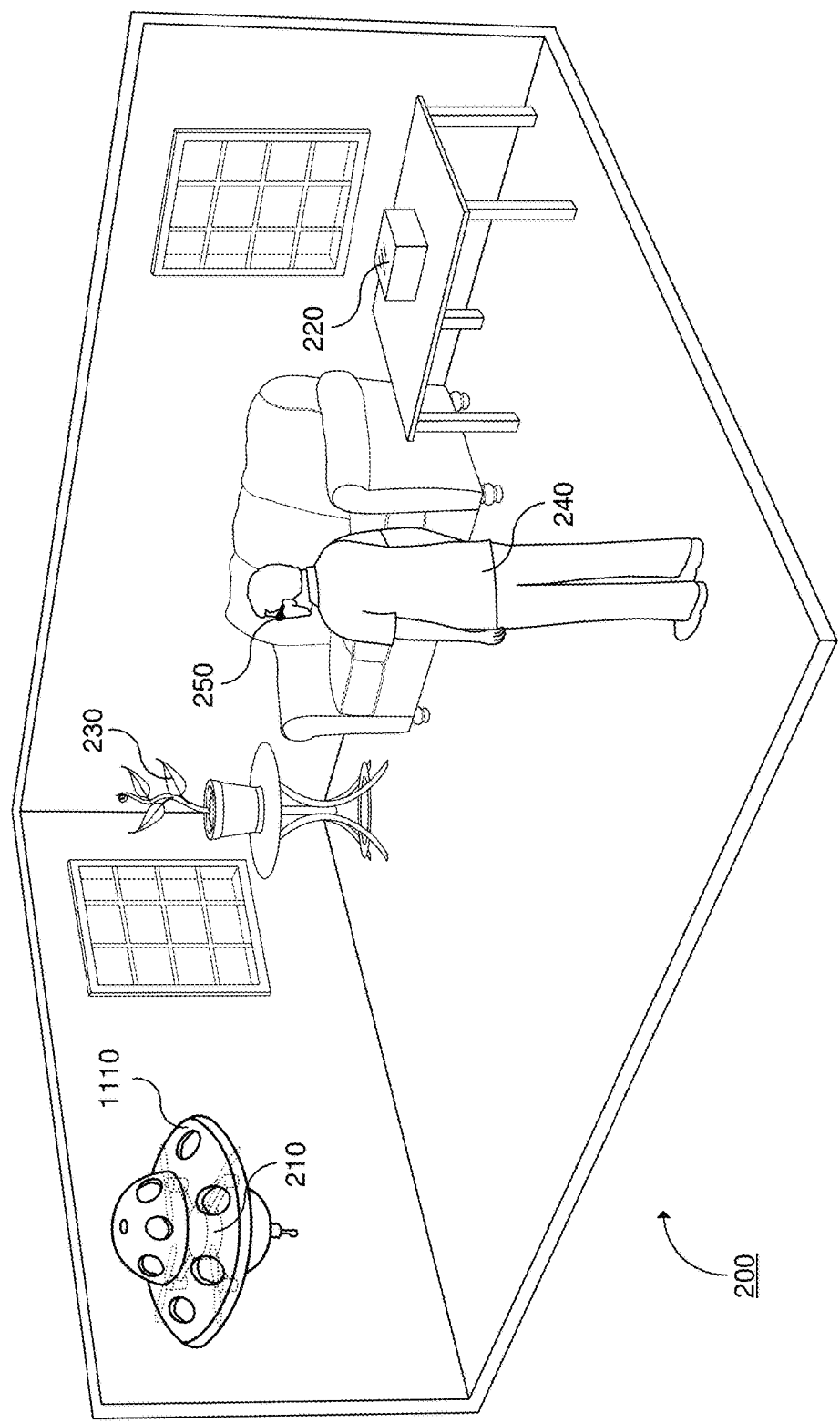
FIG. 11 illustrates an example of the first object with a corresponding avatar.

In order to provide a greater understanding of the disclosed implementations, further detail with respect to the operation of the MR device 250 and the first real-world object 210 is provided with respect to FIGS. 9-11. In FIG. 9, first real-world object 210 and user 240 are depicted in physical space 200. As noted earlier, first real-world object 210 is a dynamic object. In this case, first real-world object 210 can be understood to comprise an object that is capable of locomotion. In the example of FIGS. 9-11, first real-world object 210 is a drone. Drones can include broad range of shapes, sizes, and with various functions. Typically, drones are capable of flight and maneuverability. Drones can be often be controlled by remotes or other manual inputs. In FIG. 9, first real-world object 210 represents a standard drone that is able to fly, hover, move in three dimensions, and perform different acrobatics in the air as desired. Thus, the drone can readily change physical coordinates and move from one position to another. In other implementations, first real-world object 210 can represent any type of dynamic or static object, including but not limited to radio controlled or remote controlled vehicles, automated or autonomous vehicles, domestic household or business technologies, such as robotic vacuum cleaners, toys, security systems, programmable devices, appliances, entertainment systems, clocks, cellular devices, machinery, computers, watches, vehicles, smart devices, automated devices, robotic accessories, wheelchairs, fans, lights, or any other such devices.

In FIG. 9, first real-world object 210 or drone is located in first object position 820. A graphical virtual interface of the first software application 810 is also displayed to the user 240 in first interface position 830 as the user 240 gazes or looks at the first real-world object 210. In this case, first software application 810 comprises a graphical virtual interface for controlling and/or operating the drone. In other words, when the user 240 initially looked at the drone while operating the MR device 250, the MR device 250 was able to identify the object as a drone, determine additional details regarding the drone's identity based on the visual input being received, classify the object, and provide the user 240 with a software application for pairing with the drone. The software application is tethered to the drone, such that during each occasion or period in which the user 240 looks at the drone, the associated software application will also be made available to the user 240.

Referring next to FIG. 10, it can be seen that the drone has moved from the first object position 820 of FIG. 9 to a second position 1020. As also discussed above, the associated software application can be configured to remain tethered to the object. Thus, in some implementations, as a dynamic object moves through space, the graphical virtual interface also moves in a substantially corresponding manner. In other words, as shown in FIGS. 9 and 10, as the drone moves from the first object position 820 to the second position 1020, the graphical virtual interface of the first software application 810 follows or remains attached within a specific range or proximity of the drone. In FIG. 10, dotted lines represent the change in position of the graphical virtual interface from first interface position 830 to a second interface position 1030. In one implementation, second interface position 1030 is configured to be in proximity to second object position 1020. In some implementations, the MR device 250 can include an option of adjusting the level of proximity or average distance that the graphical virtual interface should be displayed relative to the object. In one implementation, the graphical virtual interface can be configured to glide or move at a similar speed alongside the dynamic object as the dynamic object changes position. Thus, as the drone or other dynamic objects move through physical space, the user 240 can continue to both observe and operate the objects without interruption or needing to shift their visual attention elsewhere.

In different implementations, additional features can be supplied during the use of MR device 250. For example, an object can be associated with other types of graphical elements (i.e., in addition to or as an alternative to the graphical virtual interfaces described above). In some implementations, an avatar or other visual representation or imagery of some kind can be projected on at least a portion of a surface of the object. The projected avatar can be any image or graphic or icon that is superimposed on at least a portion of the object. The projected avatar can be partly transparent or opaque. In some implementations, the avatar can be visual enhancements or supplemental to the object, or can substantially or entirely replace the view of the object with a projected image. In other words, the appearance of the object can be simulated or modified through the superimposition of an avatar on the view of the object.

In FIG. 11, first real-world object 210 includes a virtual costume or avatar 1110. In some implementations, the avatar 1110 can be selected from a set of images available to the MR device 250, or can be customized by the user 240 in other implementations. Furthermore, in different implementations, the avatar 1110 can be connected or tethered to the object in a similar manner to the virtual interfaces as described above. Thus, as an object moves or changes position, the avatar that is superimposed on the object can also move in a corresponding manner. In other words, referring to FIG. 11, as the drone moves through the physical environment, the user 240 may observe the drone as having a modified appearance that is presented as a continuous holographic display associated with the object. The user 240 can enjoy watching the drone as it operates, moves, and performs various activities while perceiving an external appearance that differs from the drone's real (physical) appearance. In another implementation, the avatar 1110 also provides the user 240 with a graphical virtual interface. Thus, an object can be associated with both a holographic modified appearance, as well as a holographic interface for user control of the object, in a single substantially unitary projection. However, in other implementations, the associated software application and the avatar may comprise two separate projections generated by the MR device 250.

Figure 12:
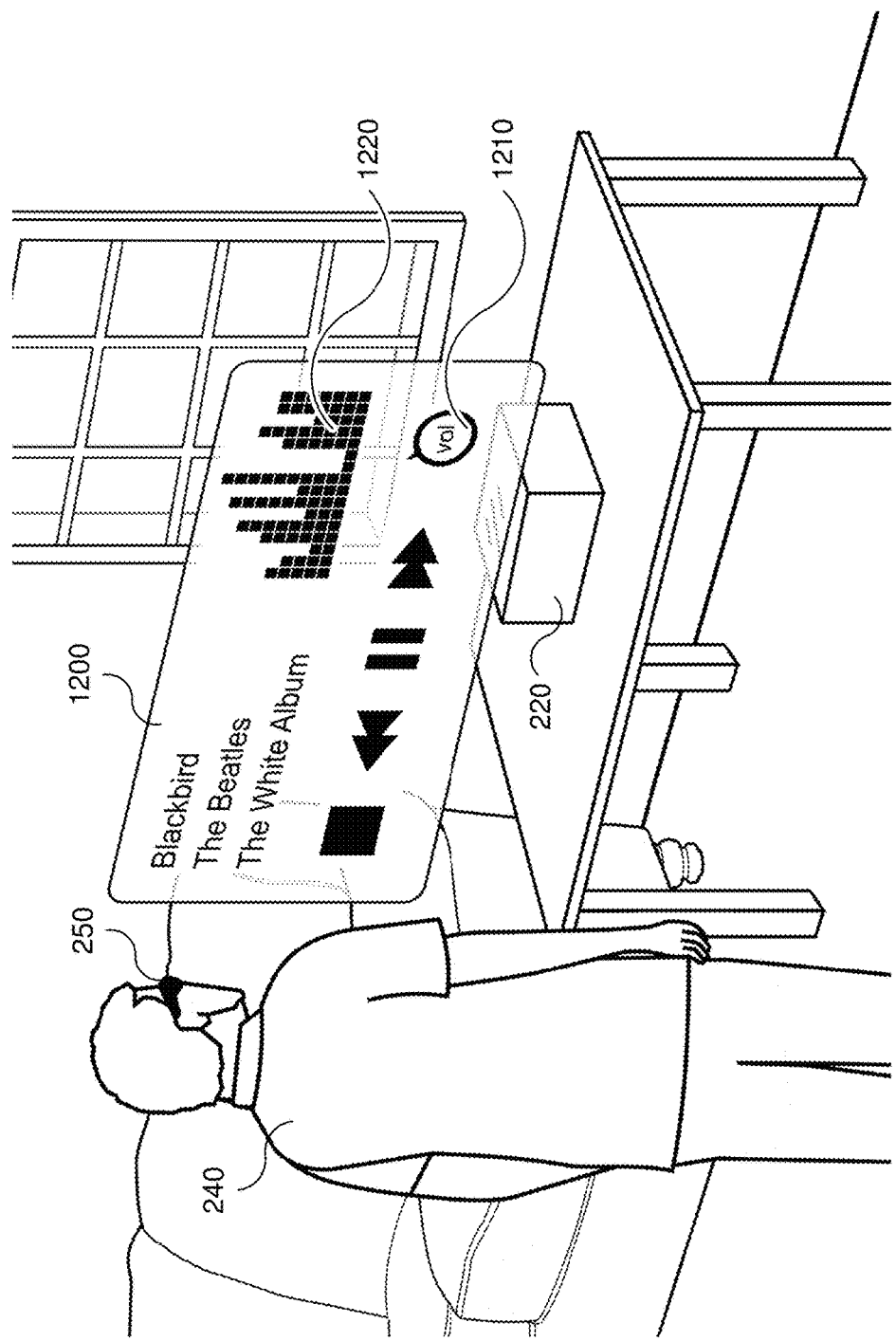
FIG. 12 illustrates an example of a second real-world object with a virtual interface provided by a software application associated with the second real-world object.
Figure 13:
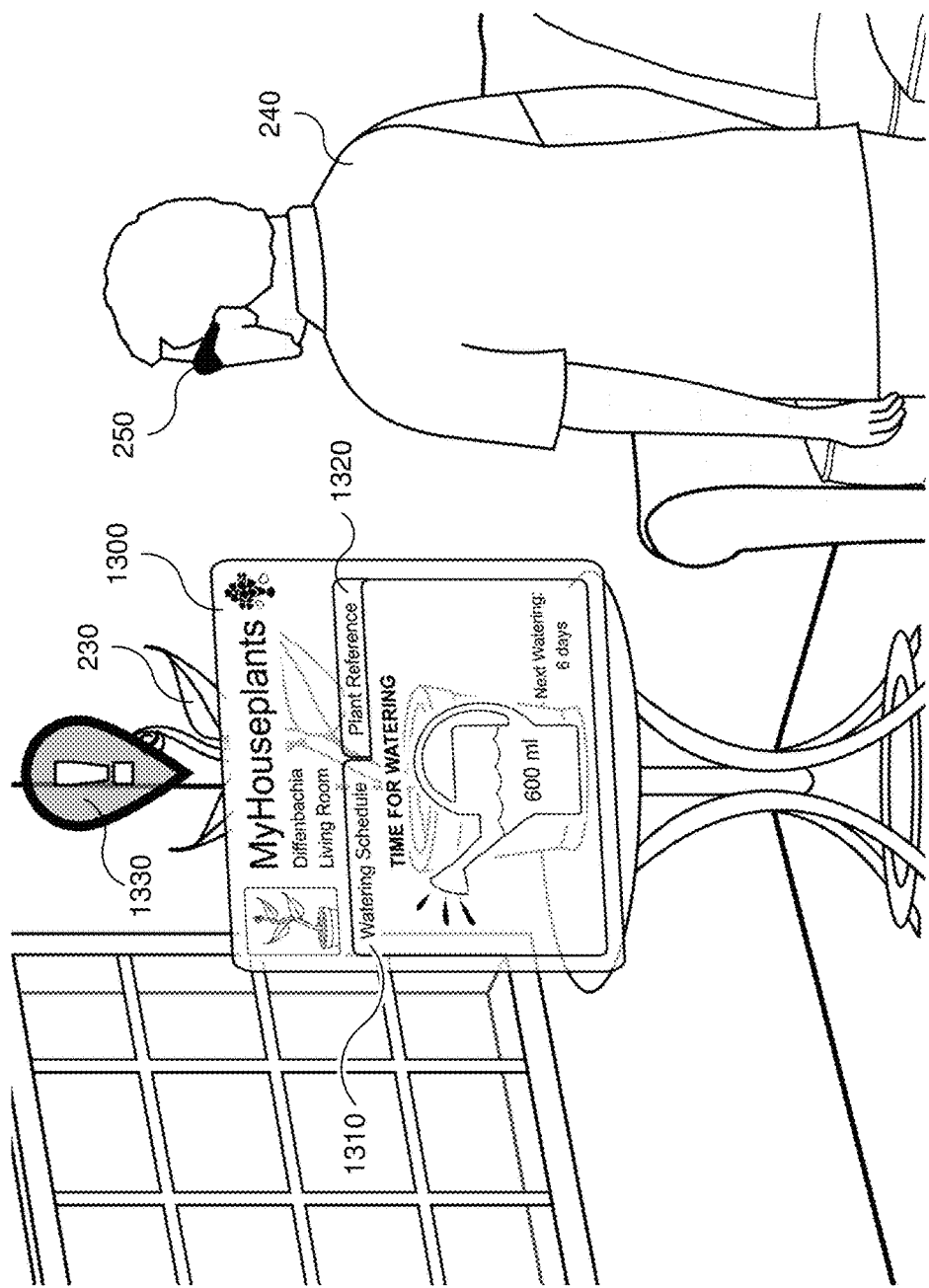
FIG. 13 illustrates an example of a third real-world object with a virtual interface provided by a software application associated with the third real-world object.

Further examples of the operation of the MR device 250 are described with respect to FIGS. 12 and 13. In FIG. 12, second real-world object 220 is shown with a corresponding graphical virtual interface 1220 of a second software application 1200 that is tethered to the second real-world object 220. For purposes of this example, second real-world object 220 is a static object. However, the features described herein can be applied to any type of object. In FIG. 12, for purposes of simplicity, second real-world object 220 comprises a type of music player. The MR device 250 has analyzed the object, identified the music player, and displays second software application 1200 that is associated with the music player. In one implementation, the second software application 200 is a holographic flat panel, configured to resemble a touchscreen display. In other implementations, the second software application 1300 can appear three-dimensional. In this case, the second software application 1200 presents a series of holographic input provisions, such as buttons, switches, dials or other input interfaces or controls, to the user 240. For example, second software application 1300 includes a knob 1210. Knob 1210 can be used to adjust (e.g., increase the volume of the music player or decrease the volume of the music player). The MR device 250 can discern when a finger of user 240 is moving in such a way so as to correspond to a use or manipulation of one of the holographic controls. For example, when the user 240 interacts with knob 1210 by turning or rotating their fingers in a first direction, the real object—here, a music player—can respond by increasing the volume of the music. Similarly, when the user 240 interacts with knob 1210 by turning or rotating their fingers in a second, different direction, the music player can respond by decreasing the volume of the music. Other controls can be available through the second software application 1200. In other implementations, the second software application 1200 can be understood to comprise the appropriate controls for any other associated "smart" object. It should be understood that the example presented herein is for illustrative purposes only, and the software application associated with an object can vary widely from that described here.

In addition, the MR device 250 can offer a variety of virtual interface types or graphical elements. In different implementations, the MR device 250 can be configured to display a graphical virtual interface that may provide the user 240 options for obtaining information related to the selected object. The object can be smart or passive, and/or static or dynamic. For example, referring to FIG. 13, third real-world object 230 is depicted with a third software application 1300. In this example, third real-world object 230 comprises a potted plant. The MR device 250 has analyzed the object, identified and classified the potted plant, and displays a graphical element(s) of third software application 1300 that is associated with the potted plant. In this case, the third software application 1300 can comprise a variety of interactive options, including but not limited to activities, information, recipes, instructions, applications, suggestions, reminders, lists, guides, videos, images, help, support, ideas, or other opportunities for the user 240 to learn, relate to, or engage further with the real object. In some implementations, the graphical element(s) presented can be a default graphical virtual interface for objects categorized or classified in one of a specific category by the MR device 250. However, in other implementations, the software application can be selected by the user 240 for use with the particular object. In other words, the user 240 may wish to associate a software application that comprises an adjustable reminder or to-do list related to the potted plant. In FIG. 13, the third software application 1300 displayed to the user 240 provides a watering schedule in a first tab 1310 and a plant reference guide in a second tab 1320 for the species of plant. In this example, if the user 240 selects the first tab 1310, the watering schedule will be presented, and options to adjust or view the schedule can be displayed. Similarly, if the second tab 1320 is selected, the reference guide for the plant will be displayed, with options to search for various terms or subjects. In some implementations, a software application can be configured to provide an alert 1330 or other notification to the user 240 based on user input, instructions, commands from the software application, or other information. It should be understood that the example presented herein is for illustrative purposes only, and the software application associated with an object can vary widely from that described here. In some implementations, the object can be linked to other objects, to provide a unified graphical virtual interface for the user 240. As one example, in FIG. 13, a digital moisture meter for the soil may be added to the potted plant, and the third software application 1300 can be configured for association with the potted plant as well as provide control of the digital meter. Thus, in some implementations, multiple objects can be grouped or aggregated for association with a single software application.

As noted earlier, in some implementations, the user 240 may use voice commands or auditory instructions to interact with objects in their environment through the MR device 250. In some cases, the user 240 may use voice controls with various objects or devices in their environment, such as a room, house, office, building, store, auditorium, or other physical spaces. For example, the user 240 may voice a request to the MR device 250 to turn on or off (or otherwise adjust or operate) one or more, or all, of the devices classified in a specific category in the room or house. The user 240 might identify the device that should be adjusted by an assigned semantic label (e.g., "the lamp in the dining room", "all of the lights in the house", "the basement lights", "the ceiling lights", "the night light", "the outdoor floodlights", and other such identifier semantic labels). Various devices can be associated with any other semantic labels to permit the user 240 to readily and naturally interact with different objects through the MR device 250.

In addition, in different implementations, the MR device 250 can be configured to assess the physical environment more globally in order to fine-tune options presented to a user. In some implementations, the MR device 250 can automatically classify a room or physical space and determine a physical context or semantic label for an object. In some cases, the physical context in which objects are identified can affect the content that is displayed to the user. As one example, the MR device 250 can detect an audio speaker in the user's bedroom, and may suggest songs associated with that location or type of location. In contrast, a speaker detected in the kitchen, where news may be played more often than music, can be associated with options for news applications by the MR device 250.

Figure 14:
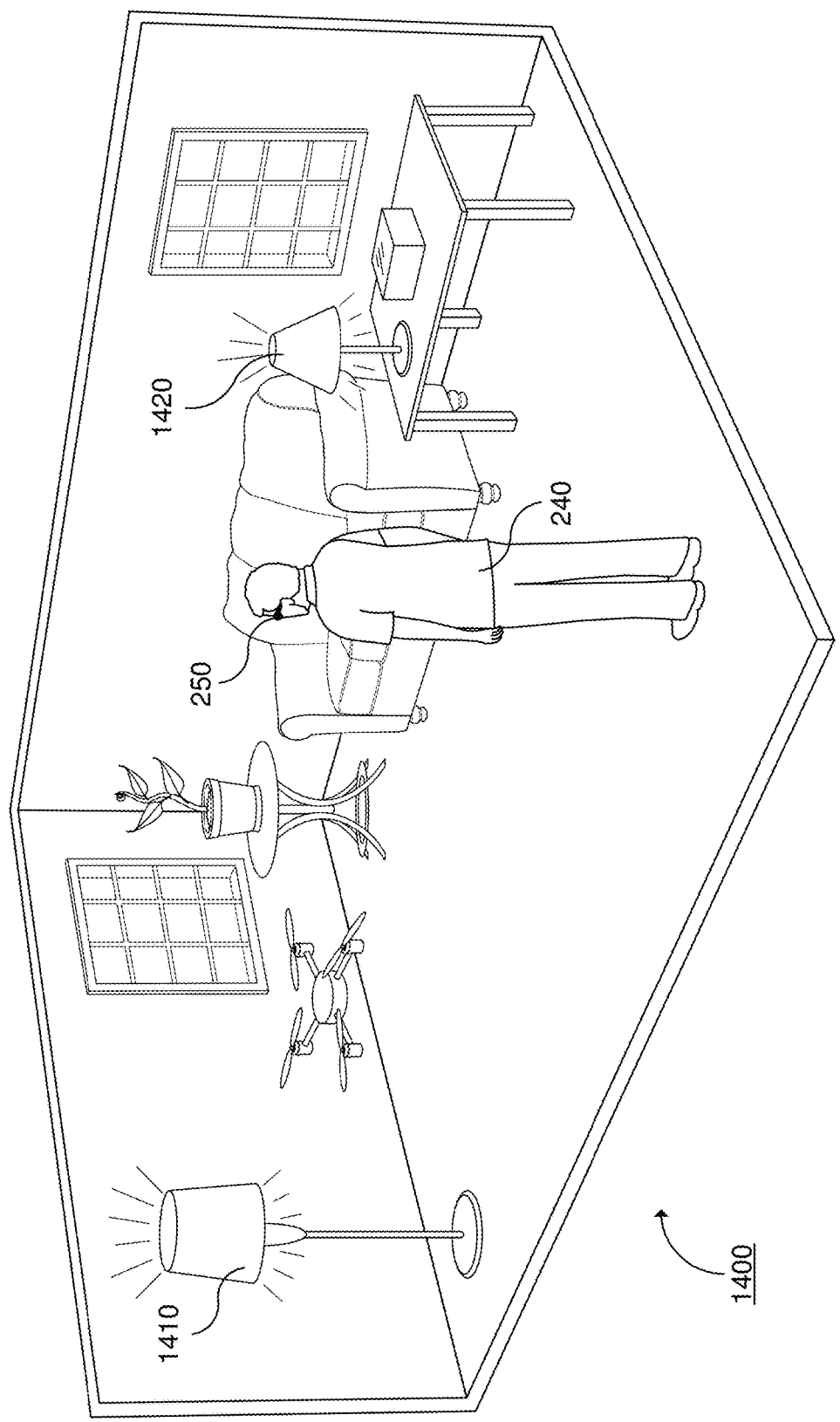
FIG. 14 illustrates an example of a plurality of objects in a physical space.

In another example, the user 240 may select the object by providing the MR device 250 with a directional cue. In some implementations, the directional cue can comprise the direction of the user's gaze while wearing the MR device 250. This can provide the information necessary to the MR device 250 to determine which object the user 240 is referring to. As shown in FIG. 14, user 240 stands in a first room 1400. The first room 1400 includes a first light source 1410 and a second light source 1420 that are both switched on. The user 240 may wish to turn off only a single light. By directing his or her gaze toward the light source that should be turned off, the user 240 can indicate to the MR device 250 which light he or she intends to be the subject of the subsequent voice command. In this example, the user 240 may speak a command such as "Turn the light off" while gazing at the first light source 1410. The MR device 250 can process the voice command and the direction of the gaze to determine that the first light source is the intended object. In this case, the MR device 250 can turn off the first light source 1410 and leave the second light source 1420 on.

In other implementations, the location of the user 240 can be used by the MR device 250 to determine which object is the intended recipient of the voice command. For example, if a first light source is located in a first room and a second light source is located in a second room, the command to turn off the light while the user 240 stands in the first room can be understood to be directed to the first light source located in the same room as the user 240.

Figure 15:
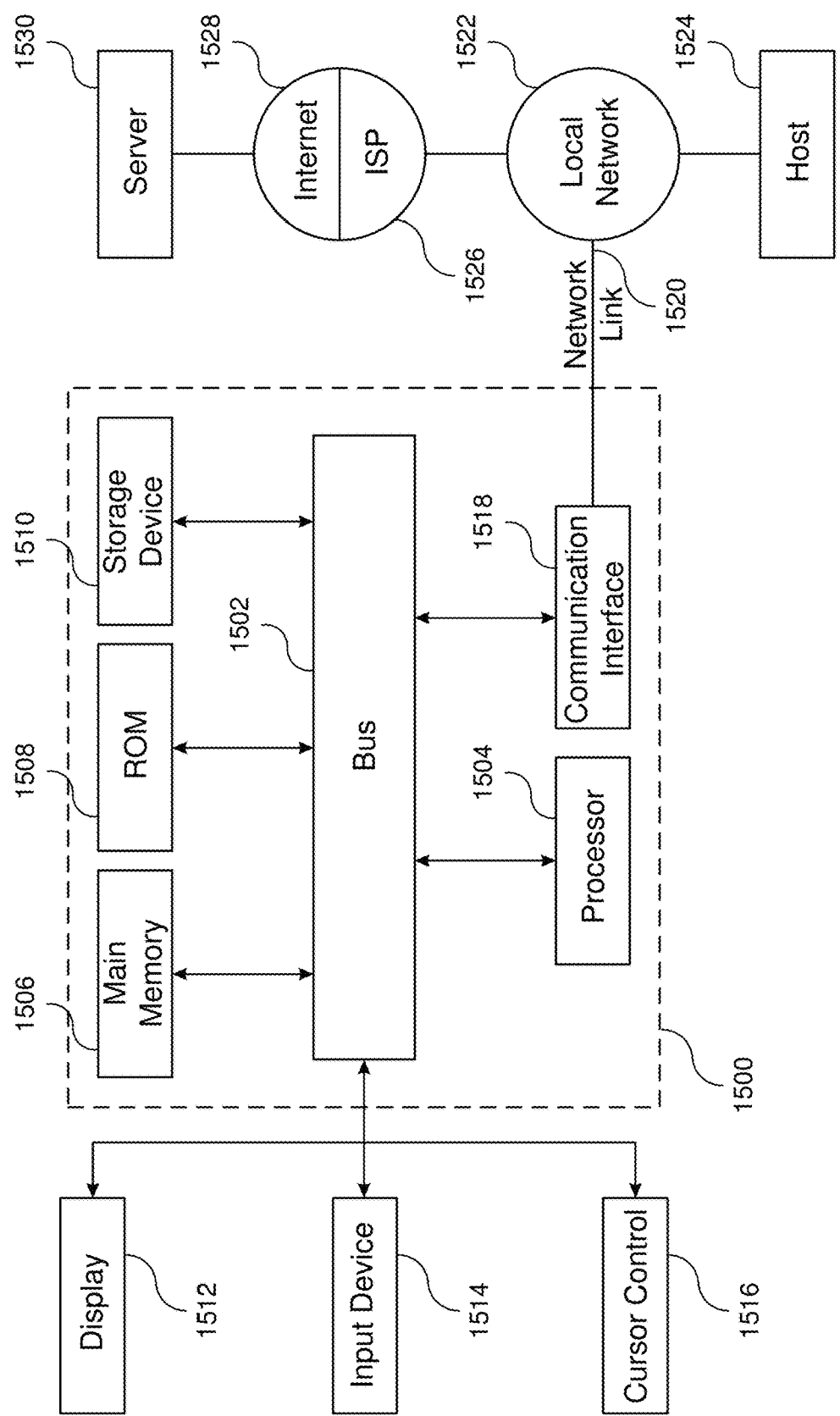
FIG. 15 illustrates a block diagram showing an example computer system upon which aspects of this disclosure may be implemented.

FIG. 15 illustrates a block diagram showing an example computer system 1500 upon which aspects of this disclosure may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. The computer system 1500 can implement, for example, one or more of, or portions of user systems 342, object/space tracking system 350, object classification system 360, space classification system 370, application recommendation system 380, and/or application repository 390 illustrated in FIG. 3. The computer system 1500 can also implement, for example, one or more of, or portions of the operations illustrated in FIG. 4.

Computer system 1500 can further include a read only memory (ROM) 1508 or other static storage device coupled to bus 1502 for storing static information and instructions for processor 1504. A storage device 1510, such as a flash or other non-volatile memory can be coupled to bus 1502 for storing information and instructions.

Computer system 1500 may be coupled via bus 1502 to a display 1512, such as a liquid crystal display (LCD), for displaying information. One or more user input devices, such as the example user input device 1514 can be coupled to bus 1502, and can be configured for receiving various user inputs, such as user command selections and communicating these to processor 1504, or to a main memory 1506. The user input device 1514 can include physical structure, or virtual implementation, or both, providing user input modes or options, for controlling, for example, a cursor, visible to a user through display 1512 or through other techniques, and such modes or operations can include, for example virtual mouse, trackball, or cursor direction keys.

The computer system 1500 can include respective resources of processor 1504 executing, in an overlapping or interleaved manner, respective program instructions. Instructions may be read into main memory 1506 from another machine-readable medium, such as storage device 1510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1510. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1500 can also include a communication interface 1518 coupled to bus 1502, for two-way data communication coupling to a network link 1520 connected to a local network 1522. Network link 1520 can provide data communication through one or more networks to other data devices. For example, network link 1520 may provide a connection through local network 1522 to a host computer 1524 or to data equipment operated by an Internet Service Provider (ISP) 1526 to access through the Internet 1528 a server 1530, for example, to obtain code for an application program.

The disclosed implementations can incorporate any of the features, components, methods, systems, software, and other aspects described in U.S. Patent Application Publication Numbers US 2015/0235432 (titled "Augmented Reality Computing with Inertial Sensors" and published on Aug. 20, 2015), US 2016/0077785 (titled "Executable Virtual Objects Associated With Real Objects" and published on Mar. 17, 2016), US 2016/0173293 (titled "3D Mapping of Internet of Things Devices" and published on Jun. 16, 2016), US 2016/0292850 (titled "Personal Audio/Visual System" and published on Oct. 6, 2016), and US 2017/0004655 (titled "Mixed Reality Interactions" and published on Jan. 5, 2017), each of which is incorporated by reference herein in their entireties.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A mixed reality device comprising:
   one or more outward facing image sensors included in the mixed reality device and configured to capture first image data for a first real-world object included in a physical space observed by the mixed reality device;
   an object classifier configured to automatically classify the first real-world object as being associated with a first object classification based on the captured first image data;
   an application identifier configured to automatically identify a first software application based on the first real-world object being associated with the first object classification;
   a controller configured to:
   store data associating the first software application with the first real-world object, and
   execute the first software application on the mixed reality device in association with the first real-world object, wherein:
   the outward facing image sensors are further configured to capture second image data for the physical space;
   the object classifier is further configured to automatically classify a plurality of real-world objects included in the physical space as being associated with respective object classifications, based on the second image data; and
   the mixed reality device further comprises a space classifier configured to automatically classify the physical space as being associated with a physical space classification based on the object classifications associated with the plurality of real-world objects.

2. The mixed reality device according to claim 1, wherein:
   the first software application is configured to display a graphical virtual interface;
   the mixed reality device further comprises:
   a display subsystem configured to display images to a user of the mixed reality device, and
   a visual renderer configured to repeatedly display the graphical virtual interface using the display subsystem so as to continue to appear in real time to be located proximate to the first real-world object while the mixed reality device moves through the physical space.

3. The mixed reality device according to claim 2, wherein the display subsystem includes a head mounted display device used to display the images.

4. The mixed reality device according to claim 3, wherein the head mounted display device includes a see-through display device configured to allow a user wearing the head mounted display device to directly view the first real world object through the see-through display device.

5. The mixed reality device of claim 1, wherein the object classifier is further configured to transmit second image data to a remote object identification system configured to automatically classify the first real-world object as being associated with the first object classification based on the second image data.

6. The mixed reality device of claim 1, wherein:
the application identifier is further configured to automatically identify, based on the first real-world object being associated with the first object classification, a plurality of software applications, wherein the first software application is included in the plurality of software applications, and the automatic identification of the first software application is performed by the automatic identification of the plurality of software applications;
the controller is further configured to:
present, to a user of the mixed reality device, the plurality of software applications as suggestions for association with the first real-world object,
receive a user selection, via the mixed reality device and in response to the presentation of the plurality of software applications, of the first software application, and
automatically download and install the first software application on the mixed reality device in response to the received selection; and
the association of the first software application with the first real-world object is stored in response to the received selection.

7. The mixed reality device of claim 1, further comprising:
a wireless receiver adapted to receive one or more wireless signals transmitted by the first real-world object,
wherein the object classifier is further configured to automatically classify the first real-world object as being associated with a first object classification based on a content of the one or more wireless signals.

8. A method for augmenting a real-world object using a mixed reality device, the method comprising:
capturing first image data for a first real-world object included in a physical space observed by the mixed reality device;
automatically classifying the first real-world object as being associated with a first object classification based on the first image data;
automatically identifying a first software application based on the first real-world object being associated with the first object classification;
associating the first software application with the first real-world object;
executing the first software application on the mixed reality device in association with the first real-world object;
automatically classifying a plurality of real-world objects included in the physical space as being associated with respective object classifications, based on second image data captured by the mixed reality device; and
automatically classifying the physical space as being associated with a physical space classification based on the object classifications associated with the plurality of real-world objects.

9. The method of claim 8, wherein:
the first software application is configured to display a graphical virtual interface; and
the method further comprises repeatedly displaying the graphical virtual interface using the mixed reality device so as to continue to appear in real time to be located proximate to the first real-world object while the mixed reality device moves through the physical space.

10. The method of claim 9, further comprising:
capturing second image data for the real-world object while the first real-world object moves through the physical space over a first period of time;
automatically determining updated positions for the first real-world object based on the second image data; and
repeatedly displaying the graphical virtual interface using the mixed reality device, based on the updated positions for the first real-world object, so as to continue to appear in real time to be located proximate to the real-world object while the real-world object moves through the physical space over the first period of time.

11. The method of claim 9, further comprising:
capturing second image data for the first real-world object while the first real-world object changes pose over a first period of time;
automatically determining updated poses for the first real-world object based on the second image data; and
repeatedly displaying the graphical virtual interface using the mixed reality device, based on the updated poses for the first real-world object, so as to continue to appear in real time to be fixed relative to a portion of the first real-world object while the first real-world object changes pose over the first period of time.

12. The method of claim 8, further comprising:
identifying an avatar comprising one or more virtual objects as being associated with the first real-world object; and
repeatedly displaying the avatar using the mixed reality device so as to continue to, in real time, superimpose the avatar on a portion of the first real-world object while the mixed reality device and/or the first real-world object move through the physical space.

13. The method of claim 8, further comprising:
automatically identifying, based on the first real-world object being associated with the first object classification, a plurality of software applications, wherein the first software application is included in the plurality of software applications, and the automatic identification of the first software application is performed by the automatic identification of the plurality of software applications;
presenting, to a user of the mixed reality device, the plurality of software applications as suggestions for association with the first real-world object;
receiving a user selection, via the mixed reality device and in response to the presentation of the plurality of software applications, of the first software application; and
automatically downloading and installing the first software application on the mixed reality device in response to the received user selection,
wherein the associating the first software application with the first real-world object occurs in response to the received selection.

14. The method of claim 8, further comprising:
automatically identifying a second software application based on the physical space being associated with the physical space classification;
associating the second software application with the physical space; and
executing the second software application on the mixed reality device in association with the physical space.

15. The method of claim 8, wherein:
the first real-world object is configured to respond to first commands received via a wired or wireless communication medium;
the first software application is configured to issue the first commands; and
the method further comprises automatically configuring the first software application to direct issued commands to the first real-world object via the wired or wireless communication medium.

16. The method of claim 8, further comprising:
in response to the automatic identification of the first software application, displaying a visual indicator using the mixed reality device so as to appear to be located proximate to the first real-world object, the visual indicator indicating to the user that the first real-world object may be augmented using one or more application programs;
receiving, via the mixed reality device, a user selection of the first real-world object while the visual indicator is being displayed; and
providing, in response to receiving the user selection, a user interface configured to receive, via the mixed reality device, a user instruction to associate the first software application with the first real-world object,
wherein the associating the first software application with the first real-world object occurs in response to receiving the user instruction.

17. A nontransitory machine readable medium including instructions which, when executed by one or more processors included in the mixed reality device, cause the mixed reality device to perform the method of claim 8.

18. A method for augmenting a real-world object using a mixed reality device, the method comprising:
capturing first image data for a first real-world object included in a physical space observed by the mixed reality device;
automatically classifying the first real-world object as being associated with a first object classification based on the first image data;
automatically identifying a first software application based on the first real-world object being associated with the first object classification;
associating the first software application with the first real-world object;
executing the first software application on the mixed reality device in association with the first real-world object; and
receiving, with a receiver included in the mixed reality device, one or more wireless signals transmitted by the first real-world object,
wherein the automatic classification of the first real-world object is further based on a content of the one or more wireless signals.

* * * * *